US012778716B2

(12) United States Patent
Gandrud et al.

(10) Patent No.: US 12,778,716 B2
(45) Date of Patent: Nov. 3, 2026

(54) AUTOMATED PROCESSING OF DENTAL SCANS USING GEOMETRIC DEEP LEARNING

(71) Applicant: Solventum Intellectual Properties Company, Eagan, MN (US)

(72) Inventors: Jonathan D. Gandrud, Woodbury, MN (US); Alexandra R. Cunliffe, St. Paul, MN (US); James D. Hansen, White Bear Lake, MN (US); Cameron M. Fabbri, St. Paul, MN (US); Wenbo Dong, Lakeville, MN (US); En-Tzu Yang, Cupertino, CA (US); Jianbing Huang, Shoreview, MN (US); Himanshu Nayar, Mountain View, CA (US); Guruprasad Somasundaram, Plymouth, MN (US); Jineng Ren, Fuzhou City (CN); Joseph C. Dingeldein, Hudson, WI (US); Seyed Amir Hossein Hosseini, St. Paul, MN (US); Steven C. Demlow, Mendota Heights, MN (US); Benjamin D. Zimmer, Hudson, WI (US)

(73) Assignee: Solventum Intellectual Properties Company, Eagan, MN (US)

( * ) Notice: Subject to any disclaimer, the term of this patent is extended or adjusted under 35 U.S.C. 154(b) by 608 days.

(21) Appl. No.: 18/253,699

(22) PCT Filed: Dec. 2, 2021

(86) PCT No.: PCT/IB2021/061230
§ 371 (c)(1),
(2) Date: May 19, 2023

(87) PCT Pub. No.: WO2022/123402
PCT Pub. Date: Jun. 16, 2022

(65) Prior Publication Data

US 2024/0008955 A1 Jan. 11, 2024

Related U.S. Application Data

(60) Provisional application No. 63/124,263, filed on Dec. 11, 2020.

(51) Int. Cl.
*A61C 7/00* (2006.01)
*A61C 13/00* (2006.01)

(52) U.S. Cl.
CPC .......... *A61C 7/002* (2013.01); *A61C 13/0004* (2013.01); *A61C 2007/004* (2013.01)

(58) Field of Classification Search
CPC ................ A61C 7/002; A61C 13/0004; A61C 2007/004; G06T 5/60; G06T 5/77;
(Continued)

(56) References Cited

U.S. PATENT DOCUMENTS

| | | | |
|---|---|---|---|
| 7,605,817 B2 | 10/2009 | Zhang et al. |
| 7,956,862 B2 | 6/2011 | Zhang et al. |

(Continued)

FOREIGN PATENT DOCUMENTS

| | | |
|---|---|---|
| CA | 3062802 A1 | 11/2018 |
| CN | 111784639 A | 10/2020 |

(Continued)

OTHER PUBLICATIONS

Jurdi et al., "High-level prior-based loss functions for medical image segmentation: A survey," Computer Vision and Image Understanding, vol. 210, Sep. 2021, 103248, ISSN 1077-3142, https://doi.org/10.1016/j.cviu.2021.103248, https://www.sciencedirect.com/science/article/pii/S1077314221000928.*

(Continued)

*Primary Examiner* — Ryan Barrett

(57) ABSTRACT

Machine learning, or geometric deep learning, applied to various dental processes and 5 solutions. In particular, generative adversarial networks apply machine learning to smile design—finished smile, appliance rendering, scan cleanup, restoration appliance design, crown and bridges
(Continued)

design, and virtual debonding. Vertex and edge classification apply machine learning to gum versus teeth detection, teeth type segmentation, and brackets and other orthodontic hardware. Regression applies machine learning to coordinate systems, diagnostics, case complexity, and 0 prediction of treatment duration. Automatic encoders and clustering apply machine learning to grouping of doctors, or technicians, and preferences.

20 Claims, 33 Drawing Sheets

(58) Field of Classification Search
CPC ....... G06T 2200/04; G06T 2207/10024; G06T 2207/10028; G06T 2207/20081; G06T 2207/20084; G06T 2207/30036; G06T 5/50; G06V 10/82; G06V 20/64
See application file for complete search history.

(56) References Cited

U.S. PATENT DOCUMENTS

| | | | | |
|---|---|---|---|---|
| 8,175,734 | B2 | 5/2012 | Fogel et al. | |
| 9,626,462 | B2 | 4/2017 | Somasundaram | |
| 2013/0329987 | A1* | 12/2013 | Gong | G06T 7/11 382/159 |
| 2019/0205606 | A1* | 7/2019 | Zhou | G06T 7/11 |
| 2019/0251694 | A1* | 8/2019 | Han | G06N 3/0464 |
| 2019/0282344 | A1 | 9/2019 | Azernikov et al. | |
| 2019/0295302 | A1* | 9/2019 | Fu | G06F 18/217 |
| 2019/0332900 | A1* | 10/2019 | Sjolund | A61N 5/1039 |
| 2020/0320685 | A1 | 10/2020 | Anssari Moin | |
| 2020/0349698 | A1 | 11/2020 | Minchenkov et al. | |
| 2020/0371494 | A1 | 11/2020 | Warner et al. | |
| 2020/0372301 | A1* | 11/2020 | Kearney | A61B 6/469 |
| 2021/0133966 | A1* | 5/2021 | Fuchs | G06F 18/214 |
| 2021/0217233 | A1 | 7/2021 | Feng | |
| 2021/0287430 | A1* | 9/2021 | Li | G06T 7/74 |
| 2021/0312635 | A1* | 10/2021 | Price | G06N 3/044 |
| 2021/0334975 | A1* | 10/2021 | Yang | G06N 3/084 |
| 2021/0407086 | A1* | 12/2021 | Liu | G06N 3/096 |
| 2022/0044407 | A1* | 2/2022 | Liu | G06T 7/11 |
| 2022/0262007 | A1* | 8/2022 | Cramer | A61C 13/34 |

FOREIGN PATENT DOCUMENTS

| | | | | | |
|---|---|---|---|---|---|
| EP | 3462373 | A1 | | 4/2019 | |
| EP | 3591616 | A1 | | 1/2020 | |
| JP | 2020096800 | A | | 6/2020 | |
| WO | WO-2019094504 | A1 | * | 5/2019 | G06V 30/19173 |
| WO | 2019122373 | A1 | | 6/2019 | |
| WO | 2020048960 | A1 | | 3/2020 | |
| WO | WO-2020127398 | A1 | * | 6/2020 | G06N 3/084 |
| WO | 2020181974 | A1 | | 9/2020 | |
| WO | 2020240351 | A1 | | 12/2020 | |
| WO | 2021240290 | A1 | | 12/2021 | |

OTHER PUBLICATIONS

Tian Sukun et al: "Automatic Classification and Segmentation of Teeth on 3D Dental Model Using Hierarchical Deep Learning Networks", IEEE Access, vol. 7, Jun. 21, 2019 (Jun. 21, 2019), pp. 84817-84828, XP011734278, DOI: 10.1109/ACCESS.2019.2924262 [retrieved on Jul. 9, 2019]* figures 1,3 *.

Xu Xiaojie et al: "3D Tooth Segmentation and Labeling Using Deep Convolutional Neural Networks", IEEE Transactions on Visualization and Computer Graphics, IEEE, USA, vol. 25, No. 7, Jul. 1, 2019 (Jul. 1, 2019), pp. 2336-2348, XP011726779, ISSN: 1077-2626, DOI: 10.1109/TVCG.2018.2839685 [retrieved on May 24, 2019]* 4.1 Boundary-Aware Tooth Simplification; 4.3.1 Hierarchical Mesh Labeling; 7. Conclusion; figure 1.

Attene, "Polygon Mesh Repairing: An Application Perspective", ACM Computing Surveys, 2013, vol. 45, No. 02, Article 15, pp. 1-33.

Cheng, "MeshGAN: Non-linear 3D Morphable Models of Faces", 2019, pp. 1-10.

Gold, "New Algorithms for 2D and 3D Point Matching: Pose Estimation and Correspondence", Pattern Recognition, 1998, vol. 31, No. 08, pp. 1019-1031.

Hanocka, "MeshCNN: A Network with an Edge", ACM Transactions on Graphics, 2019, vol. 38, No. 04, Article 90, pp. 1-12.

Hanocka, "MeshCNN: A Network with an Edge", Siggraph, 2019, pp. 1-6.

Hung, "Current Applications, Opportunities, and Limitations of AI for 3D Imaging in Dental Research and Practice", International Journal of Environmental Research and Public Health, 2020, vol. 17, No. 4424, pp. 1-18.

International Search Report for PCT International Application No. PCT/IB2021/061230, mailed on Mar. 18, 2022, 6 pages.

Jebara, "3D Pose Estimation and Normalization for Face Recognition", Centre for Intelligent Machines, 1995, pp. 1-138.

Kang, "Application of Deep Learning in Dentistry and Implantology", The Korean Academy of Oral & Maxillofacial Implantology, 2020, vol. 24, No. 3, pp. 148-181.

Kollnig, "3D Pose Estimation by Directly Matching Polyhedral Models to Gray Value Gradients", International Journal of Computer Vision, 1997, vol. 23, No. 03, pp. 283-302.

Li, "PointCNN: Convolution On X-Transformed Points", In Advances in Neural Information Processing Systems, 2018, pp. 1-11.

Qi, "PointNet: Deep Learning on Point Sets for 3D Classification and Segmentation", In Proceedings of the IEEE Conference on Computer Vision and Pattern Recognition, 2017, pp. 1-19.

Qi, "PointNet++: Deep Hierarchical Feature Learning on Point Sets in a Metric Space", 2017, pp. 1-10.

Su, "Multi-view Convolutional Neural Networks for 3D Shape Recognition", 2016, pp. 1-9.

Verma, "FeaStNet: Feature-Steered Graph Convolutions for 3D Shape Analysis", Computer Vision and Pattern Recognition, 2018, pp. 1-9.

Wang, "Dynamic Graph CNN for Learning on Point Clouds", 2018, pp. 1-13.

Wohlhart, "Learning Descriptors for Object Recognition and 3D Pose Estimation", In Proceedings of the IEEE Conference on Computer Vision and Pattern Recognition, 2015, pp. 3109-3118.

* cited by examiner

Passing: parting surface correctly bisects tooth along the outer cusp

Non-passing: parting surface bisects tooth too far facially, failing to bisect the outer cusp Passing: parting surface correctly bisects tooth along the outer cusp Non-passing: parting surface bisects tooth too far lingually, failing to bisect along the outer cusp

AUTOMATED PROCESSING OF DENTAL SCANS USING GEOMETRIC DEEP LEARNING

CROSS REFERENCE TO RELATED APPLICATIONS

This application is a national stage filing under 35 U.S.C. 371 of PCT/2021/061230, filed Dec. 2, 2021, which claims the benefit of U.S. Application No. 63/124,263, filed Dec. 11, 2020, the disclosure of which is incorporated by reference in its/their entirety herein.

BACKGROUND

Machine learning is used in a variety of industries and fields to automate and improve processes and various tasks. In the dental field, including orthodontics, many processes and tasks are performed manually and may rely upon user feedback or interaction for completion of them. Machine learning could be used in the dental field in order to automate, partially automate, or improve such processes and tasks.

SUMMARY

Embodiments use machine learning applied to various dental processes and solutions. In particular, generative adversarial networks embodiments apply machine learning to smile design—finished smile, appliance rendering, scan cleanup, restoration appliance design, crown and bridges design, and virtual debonding. Vertex and edge classification embodiments apply machine learning to gum versus teeth detection, teeth type segmentation, and brackets and other orthodontic hardware. Regression embodiments apply machine learning to coordinate systems, diagnostics, case complexity, and prediction of treatment duration. Automatic encoders and clustering embodiments apply machine learning to grouping of doctors (or technicians) and preferences.

DETAILED DESCRIPTION

Geometric Deep Learning (GDL) or machine learning methods are used to process dental scans for several dental and orthodontic processes and tasks. The use of GDL can, for example, automate, partially automate, or improve these processes and tasks. The following are exemplary uses of GDL for dental and orthodontic applications in addition to the embodiments described in the Sections below.

Use of transfer learning: The methods could use transfer learning in situations having a dearth of good training data. The methods could use a model that is pretrained for a tooth type for which there is enough training data as a base model and fine tune its weights, either completely or partially, to create a new model suitable for working with the first (data deficient) tooth type.

Use of other modalities: GDL could be used with multi-view two-dimensional (2D) projections, for example, multi-view convolutional neural networks (MVCNN).

Use of multiple modalities together: The methods could create pipelines that use machinery from all or some of the modalities to create a hybrid pipeline. This pipeline is capable of ingesting data with multiple modalities.

Figure 1:
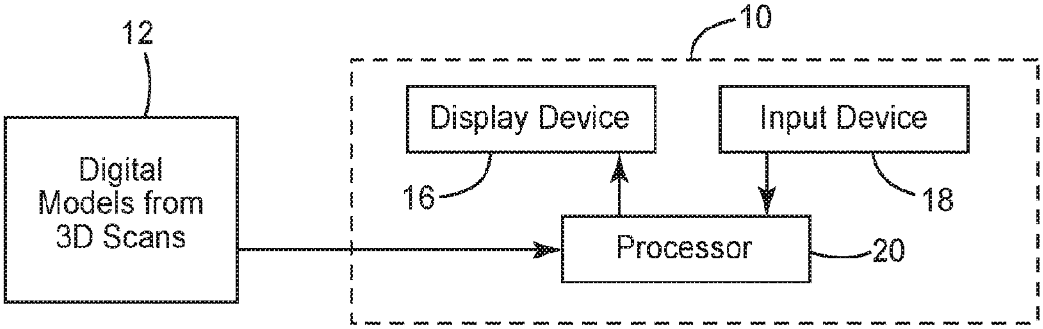
FIG. 1 is a diagram of a system for receiving and processing digital models based upon 3D scans.

FIG. 1 is a diagram of a system 10 for receiving and processing, using GDL, digital 3D models based upon intra-oral three-dimensional (3D) scans or scans of physical models. System includes a processor 20 receiving digital 3D models of teeth (12) from intra-oral 3D scans or scans of impressions of teeth. System 10 can also include an electronic display device 16, such as a liquid crystal display (LCD) device, and an input device 18 for receiving user commands or other information. Systems to generate digital 3D images or models based upon image sets from multiple views are disclosed in U.S. Pat. Nos. 7,956,862 and 7,605,817, both of which are incorporated herein by reference as if fully set forth. These systems can use an intra-oral scanner to obtain digital images from multiple views of teeth or other intra-oral structures, and those digital images are processed to generate a digital 3D model representing the scanned teeth. System 10 can be implemented with, for example, a desktop, notebook, or tablet computer. System 10 can receive the 3D scans locally or remotely via a network.

I. Generation—Generative Adversarial Networks (GANs)

These embodiments include, for example, the following.

Restoration final smile design: Using generative adversarial networks to create a 3D mesh of final smile based off of the initial 3D mesh.

Restoration appliance design: Using generative adversarial networks (GANs) to create a restoration appliance based on the 3D mesh of the final smile design.

Crown and bridges design: Using GANs to provide the capability of displaying how appliances (braces, brackets, etc.) would look during the course of the treatment.

Virtual debonding: Using GANs to generate scanned arch meshes without appliances based off of initial 3D scans of the arches that contain appliances (brackets, retainers, or other hardware) and, alternatively using machine learning segmentation module to identify brackets, retainers, or other hardware that is present in the scanned arches. GANs or 3D mesh processing may then be used to remove the appliances form the scan meshes.

A. Mesh Cleanup

These embodiments include methods for automated 3D mesh cleanup for dental scans. There are three main approaches: a 3D mesh processing approach; a deep learning approach; and a combination approach that employs some 3D mesh processing elements and some deep learning elements.

Section 1: 3D Mesh Processing for Dental Scan Cleanup.

Figure 2:
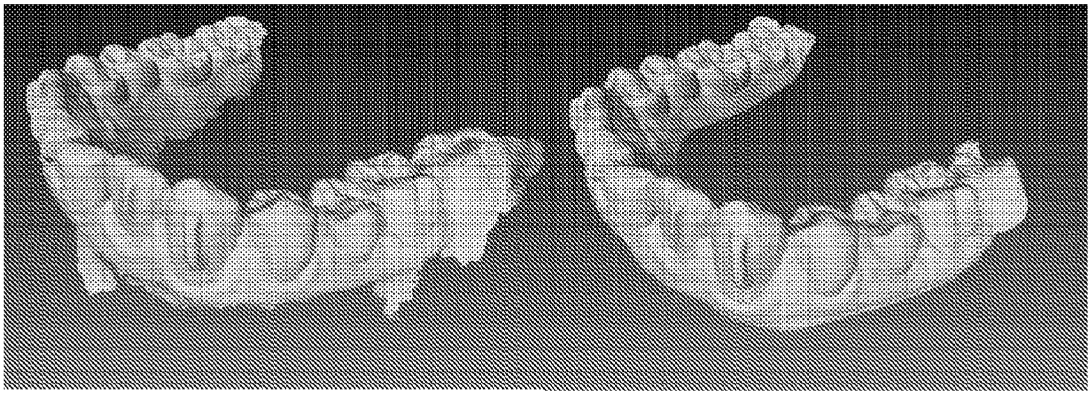
FIG. 2 illustrates raw (left) and cleaned and gum-clipped/bridged (right) versions of the same model.

The methods receive raw (pre-cleanup) digital dental models generated by a variety of intra-oral and lab scanners with varying characteristics of their 3D meshes. The methods utilize standard, domain-independent 3D mesh repair techniques to guarantee certain mesh qualities that avoid mesh processing problems in subsequent operations. The methods also use custom, orthodontic/dental domain-specific algorithms such as model base removal and partial gum clipping/bridging, as shown in FIG. 2 illustrating raw (left image) and cleaned and gum-clipped/bridged (right image) versions of the same model. These automated cleanup results may be further refined via manual interaction using off-the-shelf or custom mesh manipulation software. The mesh cleanup can thus include modifying the mesh or model by, for example, removing features, adding features, or performing other cleanup techniques.

Section 2: Deep Learning for Dental Scan Cleanup.

As more data is acquired, machine learning methods and particularly deep learning methods start performing on par or exceed the performance of explicitly programmed methods. Deep learning methods have the significant advantage of removing the need for hand-crafted features as they can infer several useful features using a combination of several non-linear functions of higher dimensional latent or hidden features directly from the data through the process of training. While trying to solve the mesh cleanup problem, directly operating on the 3D mesh might be desirable using, for example, methods such as PointNet, PointCNN, MeshCNN, and FeaStNetre.

Deep learning algorithms have two main development steps: 1) Model training and 2) Model deployment.

Model training makes use of multiple raw (pre-cleanup) and cleaned up digital 3D models for historic case data. Raw or partially cleaned up 3D models are input into a deep learning framework that has been architected to generate predicted improved cleaned up 3D models. Optionally, data augmentation may be applied to the input models to increase the amount of data that is input into the deep learning model. Some data augmentation techniques include mesh translation and rotation, uniform and non-uniform scaling, edge flipping, and adding random noise to mesh vertices. Next, the model is trained through a process that iteratively adjusts a set of weights to minimize the difference between predicted and actual cleaned up digital 3D models. The trained model is then evaluated by generating cleaned up meshes for a reserve set of cases that were not used during training and comparing these generated 3D meshes to cleaned up meshes for the actual case data.

The model deployment stage makes use of the trained model that was developed during model training. The trained model takes as input a raw digital 3D model for a new never-before-seen case and generates a cleaned-up 3D model for this case.

Figure 3:
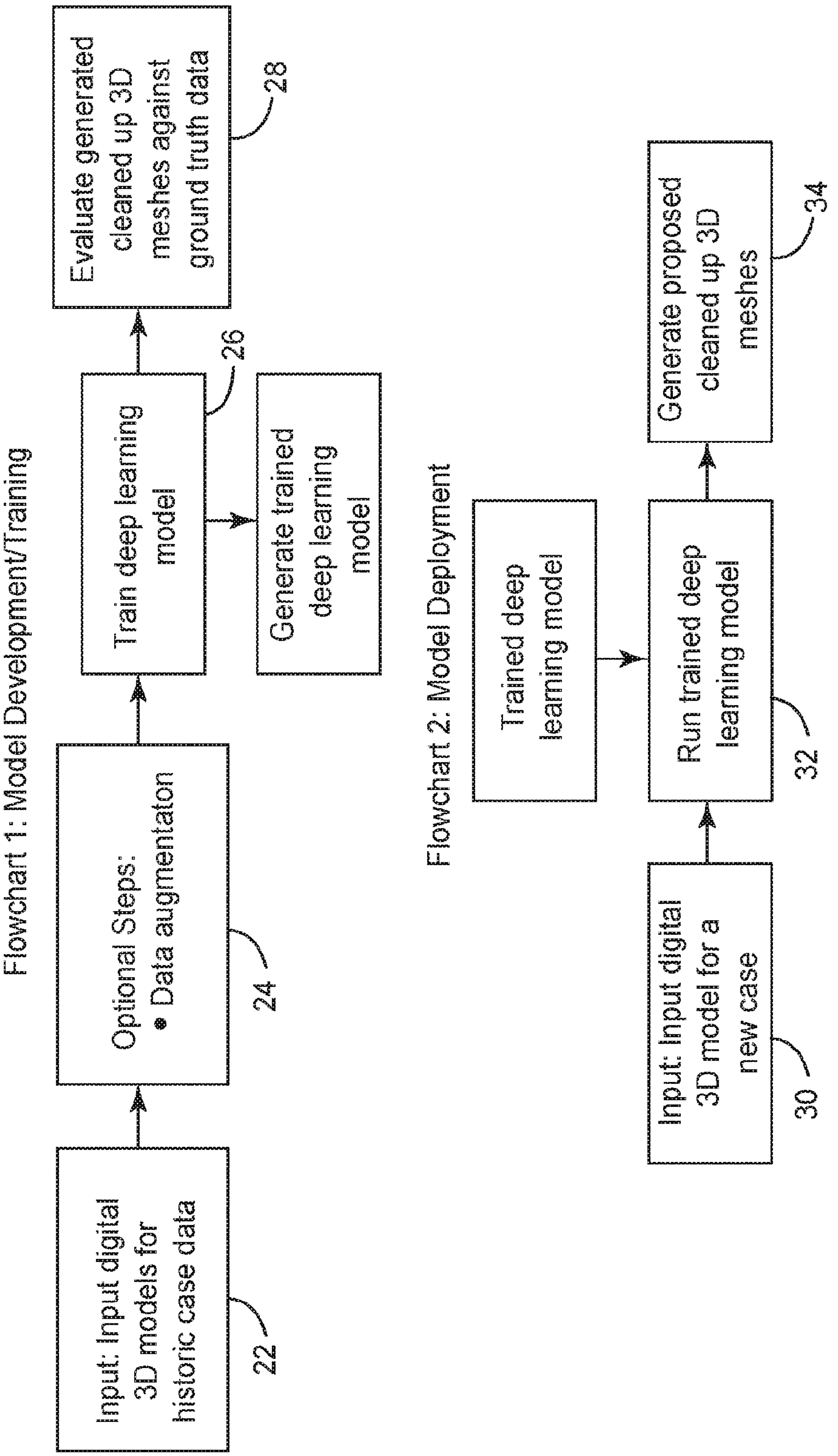
FIG. 3 provides flow charts for model development/training and model deployment.

FIG. 3 provides flow charts for the following model development/training and model deployment methods, as further described herein.

Model development/training:

1. Input: 3D models for historic cases data (22).
2. Optional data augmentation (24).
3. Train deep learning model (26).
4. Evaluate generated cleaned up 3D meshes against ground truth data (28).

Model deployment:

1. Input: Digital 3D model for a new case (30).
2. Run trained deep learning model (32).
3. Generate proposed cleaned up 3D meshes (34).

Section 3: Combination Approach (3D Mesh Processing+Deep Learning).

Figure 4:
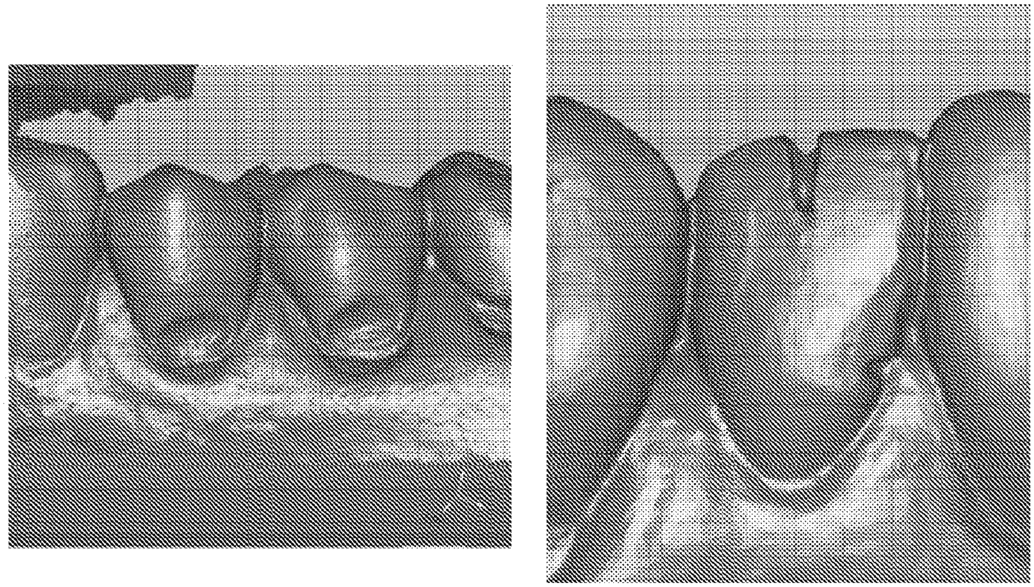
FIG. 4 illustrates pathologic features including abfraction (left) and chipped teeth (right).

As described in Section 2, it is possible to use deep learning to generate cleaned up meshes from input scans without any explicitly programmed 3D mesh processing steps. Some mesh cleanup operations (e.g., hole filling, removing triangle intersections, and island removal), however, are well-defined mesh operations and likely more effectively implemented using 3D mesh processing methods rather than deep learning. Instead, the methods can implement a combination approach that uses deep learning in place of some but not all mesh processing steps described in Section 1. For example, deep learning can be used to identify the gum line in a mesh, allowing for excess material below the gum line to be removed. Deep learning may also be used to identify pathologic features (see FIG. 4) in dental scans including divots, chipped teeth, abfractions, and recession. Once detected, these features can either be repaired using a 3D mesh processing algorithm, or a deep learning model can be trained to directly repair pathologic features. FIG. 4 illustrates pathologic features including abfraction (left image) and chipped teeth (right image).

B. Mesh Cleanup Using Inferences

These methods use GANs and GDL to automate the manual mesh clean process based on trends learned from the data. Defects in the meshes include topological holes, non-smooth surfaces., etc. In these methods, a machine learning approach is used to construct a mapping between meshes in the uncleaned state to meshes in their cleaned state. This mapping is learned through adversarial training and is embodied in the conditional distribution of cleaned up meshes, given the corresponding uncleaned source mesh. The model is trained using a dataset of point clouds acquired using intra-oral scans (referred to as data points) in the uncleaned state and the corresponding meshes after they go through a cleaning process, done by either semi-automated software programs or completely manually by trained humans.

This machine learning model can later be used as a preprocessing step for other geometric operations. For instance, in the case of digital orthodontics this model could be used to standardize the incoming point cloud in a coordinate system that is conducive for processing without requiring a human in the loop. This effectively and significantly reduces the processing time for each case as well as the need to train human workers to perform this task. Additionally, because the machine learning model is trained on data generated by a multitude of trained humans, it has the potential to achieve higher accuracy when compared to a single human on their own.

Figure 5:
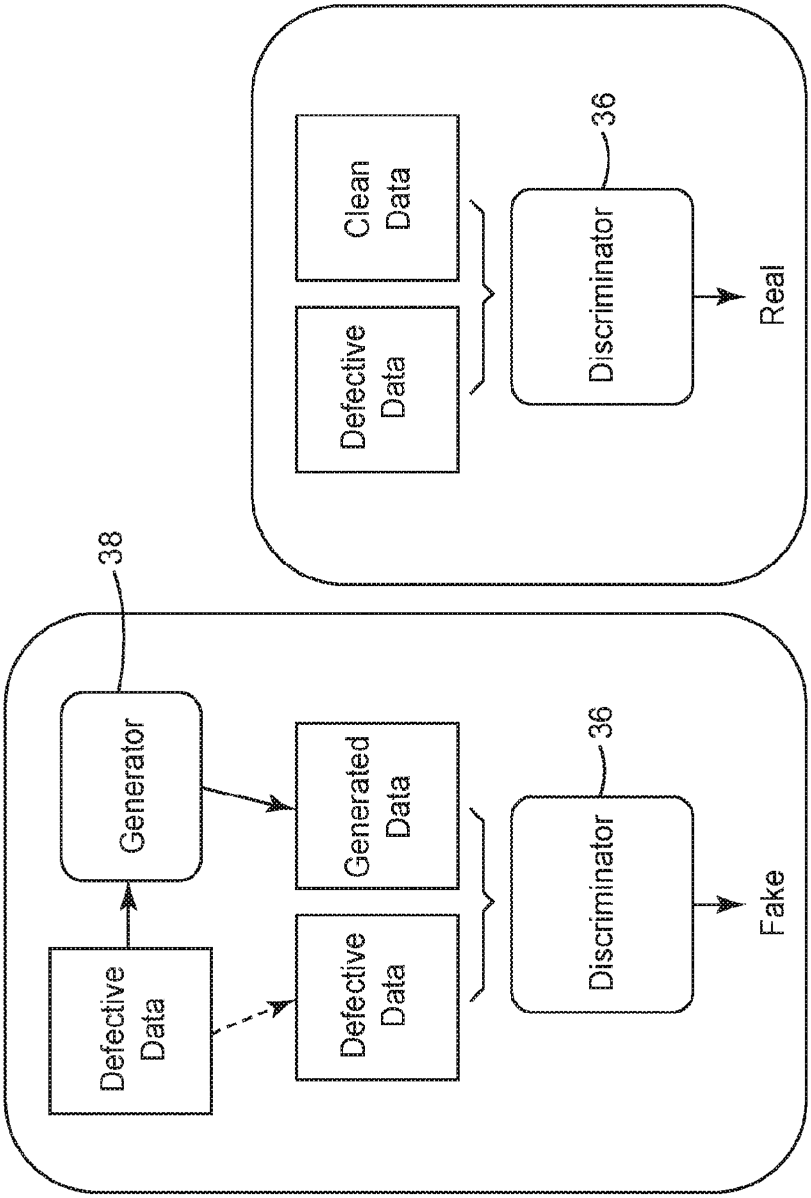
FIG. 5 is an overview of a training pipeline.

FIG. 5 illustrates the high-level workflow for the training pipeline of the methods. Because the discriminator is only used to help train the generator, during inference (deployment) it is not used. The discriminator (36) learns to classify tuples of {unclean, clean} data points, while the generator (38) learns to generate a fake clean data point to fool the discriminator.

Figure 6:
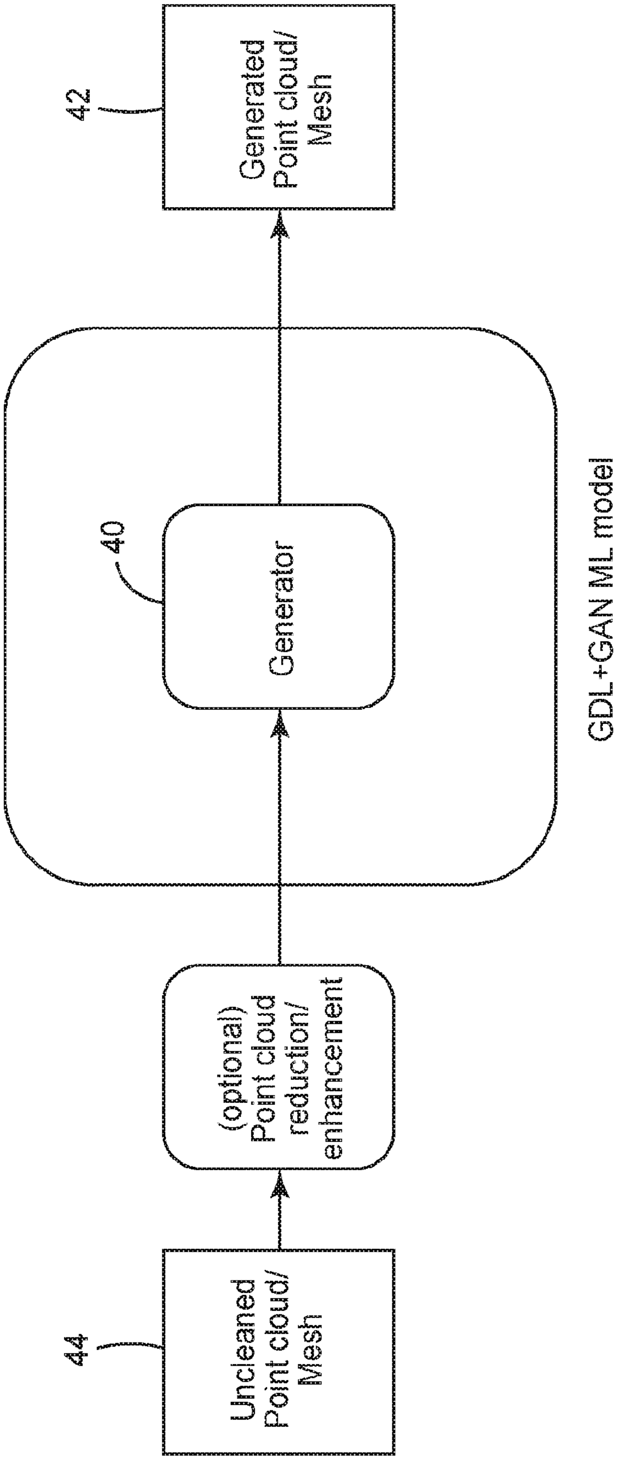
FIG. 6 is a method workflow for inference (deployment) of a model in which the generator produces a clean data point given and unclean data point.

FIG. 6 is a method workflow for inference (deployment) of the model in which the generator (40) produces a clean data point (42) given an unclean data point (44). In this stage, the discriminator is no longer needed.

The following are stages in the workflow:

1. Preprocessing.
   a. (Optional) Reduction/Enhancement: The methods can use point cloud reduction techniques such as random down sampling, coverage aware sampling or other mesh simplification techniques (if meshes are available) to reduce the size of the point cloud, to facilitate faster inference. The methods can also use mesh interpolation techniques to enhance the size of the point cloud to achieve higher granularity.
2. Model Inference:

The preprocessed mesh/point cloud is passed through the machine learning model and a generated mesh/point cloud is obtained. The steps related to the use of the machine learning model are provided below.

a. Training of the model: The model is embodied as a collection of tensors (referred to as model weights). Meaningful values for these model weights are learned through the training process. These weights are initialized completely at random.

The training process uses training data, which is a set of pairs of unclean and cleaned meshes/point clouds. This data is assumed to be available before the creation of the model.

The model has two major parts: one is the generator and the other is the discriminator. The generator takes in a mesh/point cloud and generates another mesh/point cloud. This generated mesh/point cloud has some desired geometric traits. The discriminator takes the generated mesh/point cloud and gives it a score. The discriminator is also given the corresponding ground truth cleaned mesh/point cloud and gives out another score. The adversarial loss encodes the dissimilarity between these two scores. The total loss function can include other components as well. Some components could be introduced to enforce rules-based problem-specific constraints.

The methods pass batches randomly selected from the training data set into the model and compute the loss function. The methods infer the gradients from the computed loss function and update the weights of the model. During the training of the model, the generator is updated to minimize the total function and the discriminator is updated to maximize it. This process is repeated either for a predefined number of iterations or until a certain objective criterion is met.

b. Validation of the model: Alongside training, it is typical for models to be constantly validated to monitor potential problems with training, such as overfitting.

The methods assume that there is a validation set available at the beginning of training. This data set is similar to the training data set in that it is a set of paired unclean and cleaned meshes/point clouds.

After a set number of training iterations, the methods pass the validation set thorough the model and compute the loss function value. This value serves as a measure of how well the model generalizes on unseen data. The validation loss values can be used as a criterion for stopping the training process.

c. Testing of the model: The testing of the model typically happens on unseen data points, those that do not have an associated ground truth cleaned mesh/point cloud. This is done in deployment.

C. Dental Restoration Prediction

These methods use GANs and GDL to predict the meshes after dental restoration has happened given a mesh representing the initial state of the mesh on the basis of a trends learned from a training set.

In these methods, a machine learning approach is used to construct a map between meshes in the uncleaned state to meshes in their cleaned state. This map is learned through adversarial training and is embodied in the conditional distribution of meshes of restored teeth, given the mesh corresponding to initial state. The model is trained using a dataset of point clouds acquired using intra-oral scans (referred to as data points) in the unrestored initial state and the corresponding meshes after they go through a restoration process.

The inference machine learning model can later be used for smile prediction, which could enable the orthodontists to show their patients the final state of the restored arch after the restoration process has been completed in software.

Figure 7:
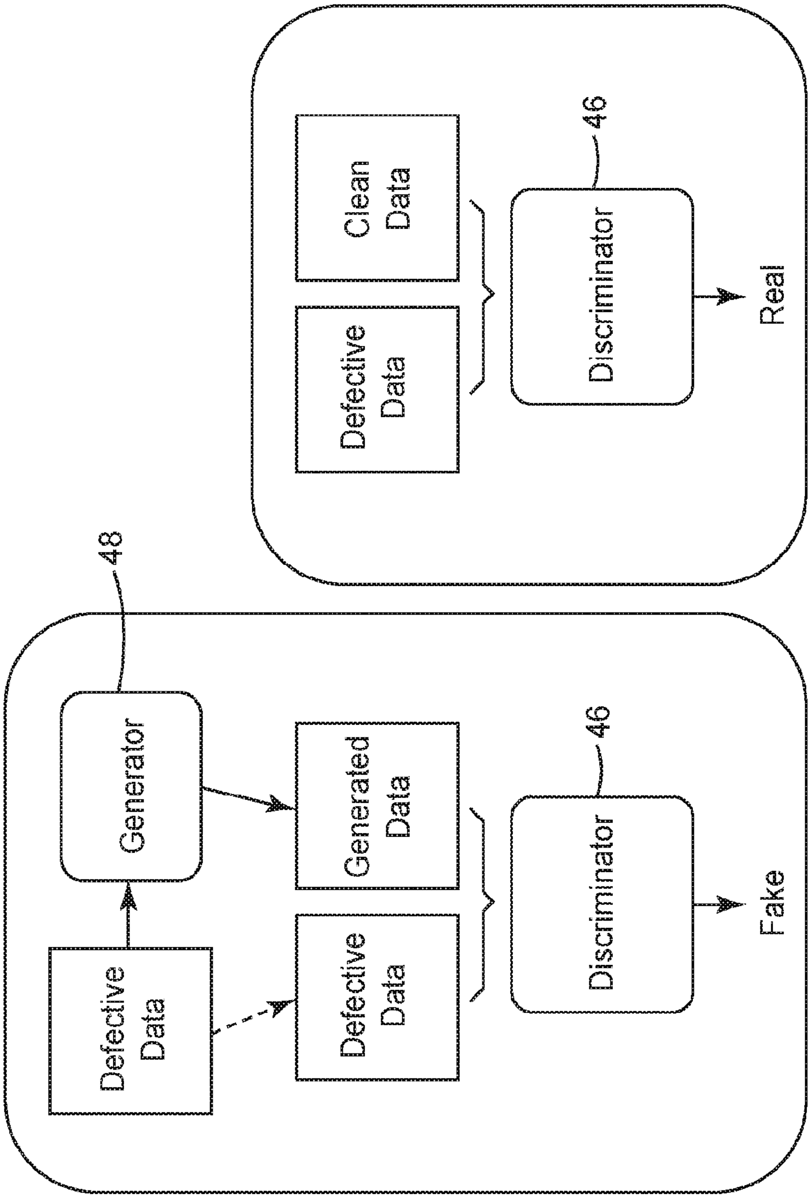
FIG. 7 is an overview of a training pipeline.

FIG. 7 illustrates the high-level workflow for the training of the methods. Because the discriminator is only used to help train the generator, during inference (deployment) it is not used. The discriminator (46) learns to classify tuples of {unclean, clean} data points, while the generator (48) learns to generate a fake clean data point to fool the discriminator.

Figure 8:
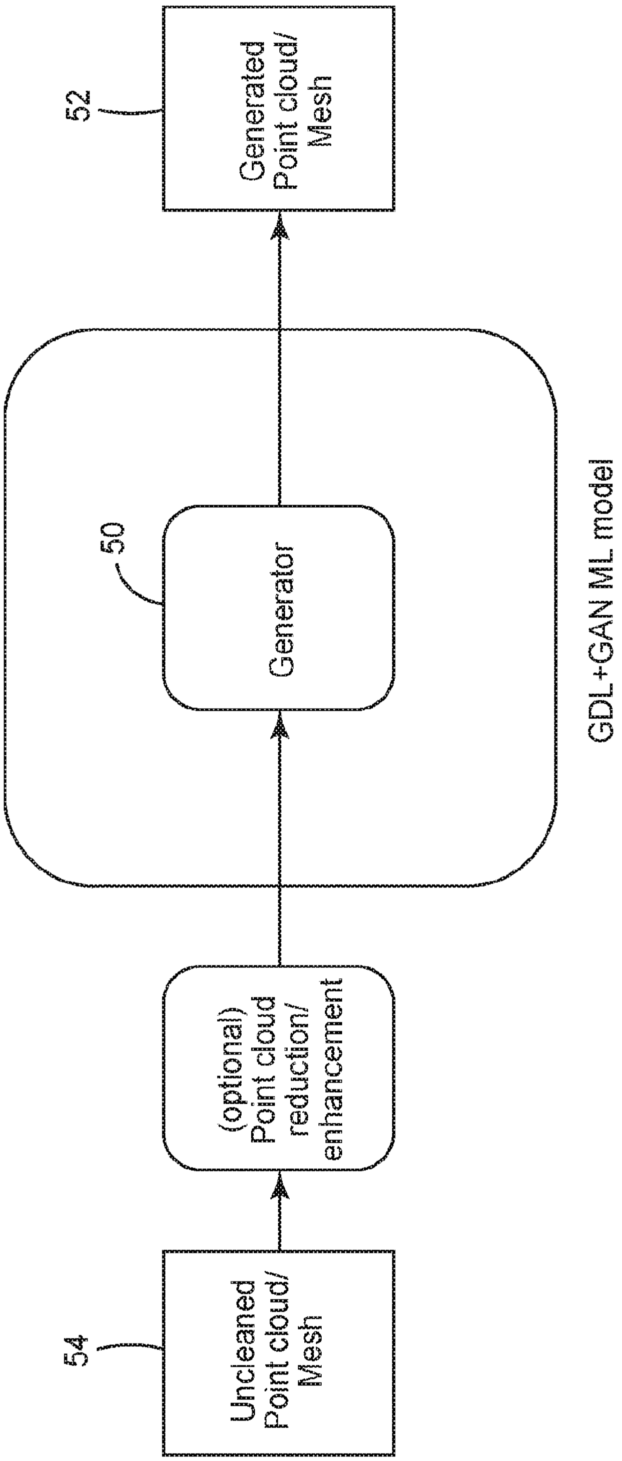
FIG. 8 is a method workflow for inference (deployment) of a model in which the generator produces a clean data point given and unclean data point.

FIG. 8 is a method workflow for inference (deployment) of the model in which the generator (50) produces a clean data point (52) given an unclean data point (54). In this stage, the discriminator is no longer needed.

The following are stages in the workflow:

1. Preprocessing:
   a. (Optional) Reduction/Enhancement: The methods can use point cloud reduction techniques such as random down sampling, coverage aware sampling or other mesh simplification techniques (if meshes are available), to reduce the size of the point cloud to facilitate faster inference. The methods can also use mesh interpolation techniques to enhance the size of the point cloud to achieve higher granularity.
2. Model Inference:

The preprocessed mesh/point cloud is passed through the machine learning model and a generated mesh/point cloud is obtained. The steps related to the use of the machine learning model are provided below.

a. Training of the model: The model is embodied as a collection of tensors (referred to as model weights). Meaningful values for these model weights are learned through the training process. These weights are initialized completely at random.

The training process uses training data, which is a set of pairs of unclean and cleaned meshes/point clouds. This data is assumed to be available before the creation of the model.

The model has two major parts: one is the generator and the other is the discriminator. The generator takes in a mesh/point cloud and generates another mesh/point cloud, this generated mesh/point cloud has some desired geometric traits. The discriminator takes the generated mesh/point cloud and gives it a score. The discriminator is also given the corresponding ground truth cleaned mesh/point cloud and gives out another score. The adversarial loss encodes the dissimilarity between these two scores.

The total loss function can include other components as well. Some components could be introduced to enforce rules-based problem-specific constraints.

The methods pass batches randomly selected from the training data set into the model and compute the loss function. The methods infer the gradients from the computed loss function and update the weights of the model. During the training of the model, the generator is updated to minimize the total function and the discriminator is updated to maximize it. This process is repeated either for a predefined number of iterations or till a certain objective criterion is met.

b. Validation of the model: Alongside training, it is typical for models to be constantly validated to monitor potential problems with training, such as overfitting.

The methods assume that there is a validation set available at the beginning of training. This data set is similar to the training data set, in that it is a set of paired unclean and cleaned meshes/point clouds.

After a set number of training iterations, the methods pass the validation set thorough the model and compute the loss function value. This value serves as a measure of how well the model generalizes on unseen data. The validation loss values can be used as a criterion for stopping the training process.

c. Testing of the model: The testing of the model typically happens on unseen data points, those that do not have an associated ground truth cleaned mesh/point cloud. This is done in deployment.

D. Dental Restoration Validation

These methods determine the validation state of a component for use in creating a dental restoration appliance. These methods can facilitate automating the restoration appliance production pipeline. There are at least two embodiments: 1) an embodiment that uses a GraphCNN to apply a class label (i.e., pass or fail) to the 3D mesh component, and 2) an embodiment that uses a CNN to apply a class label (i.e., pass or fail) to a set of one or more 2D raster images that represents one or more views of the 3D mesh component.

Each embodiment uses a neural network (NN) to distinguish between two or more states of a representation of a component to be used in a dental restoration appliance, optionally for the purpose of determining if that component is acceptable for use in building the appliance.

These embodiments can perform quality assurance (QA) on a completed dental restoration appliance. In some production pipelines, a qualified person must inspect the completed appliance and render a pass/no-pass determination. These embodiments can automate the process of validating a restoration appliance and eliminate one of the largest remaining "hidden factories" of effort, reducing, for example, a one- to two-day pipeline process to as little as half an hour for many cases.

These embodiments can validate components of a dental restoration appliance and/or the completed dental restoration appliance. The advantage of using these embodiments for such a QA process is that the NN can assess the quality of generated components and placed components faster and more efficiently than is possible by manual inspection, allowing the QA process to scale far beyond a few experts. As a further advantage, the NN may produce a more accurate determination of the quality of the shape or placement of a component than would otherwise be possible by manual inspection, for example if the NN recognizes subtle abnormalities that a human would miss. As still a further advantage, the use of the NN and the examination of the results of that NN may help a human operator become trained to recognize a proper appliance component design. In this manner, knowledge may be transferred to new human experts.

In a further application, these embodiments support the creation of an extensive automated regression test framework for the code that generates and/or places components. The advantage of this further application is to make comprehensive regression testing possible. These embodiments enable a regression testing framework to automatically validate the outputs of dozens of processed cases and can do so as often as the developer chooses to run the tests.

Embodiment 1—Using 3D Data

These embodiments can be implemented using in part, for example, the open source toolkit MeshCNN to implement the Graph CNN (GCNN). MeshCNN has a sample program that inputs a mesh and assigns a class label to that mesh. The sample program has a long list of possible classes. The sample program that comes with MeshCNN is able to classify these 3D meshes in order to assign the appropriate label. MeshCNN is adapted to distinguish between two or more states (e.g., pass/no-pass) of a component that is to be used in the creation of a dental restoration appliance (i.e., a mold parting surface).

Embodiment 2—Using 2D Raster Images

This implementation is similar to the Embodiment 1 implementation, except that the GCNN is replaced with a CNN. The CNN is trained to classify 2D raster images. For a given component, the CNN would be trained to recognize each of a set of different views of the 3D geometry of the component (e.g., a parting surface) by itself, in conjunction with other features, represented in the final appliance design, or combinations thereof; alone, in relation to the input dental structure, or both. These 2D raster images are produced with, for example, the commercial CAD tool Geomagic Wrap or open-source software tools such as Blender.

Application 1—Regression Testing

As a proof of concept, MeshCNN was used to train a NN to distinguish between examples of "passing" mold parting surfaces and "non-passing" parting surfaces. "Passing" and "non-passing" are subjective labels that can be determined by experts and may vary between different experts. This type of label stands in contrast to, for example, the label of "dog" for an ImageNet image of a dog. The label of "dog" is objective and does not involve any expert opinion.

The NN of these embodiments could be incorporated into a regression testing system for testing the quality of the code that automates the production of parts to be used in the production of a dental restoration appliance. Typically, regression tests are used to determine whether recent changes to code or to inputs have negatively affected the outputs of a system. In the present case, there is a need to be able to change a few lines of the automation code and rapidly determine whether those changes have had any adverse effects on the outputs on our suite of test cases. There may be dozens of test cases. The outputs of the dozens of test cases can be inspected manually, but at great cost in terms of the time required for a technician or other person to manually inspect the outputs for all test cases. The advantage of the present embodiment is to streamline the process. Even if 1 out of 36 test cases fails to produce acceptable results after the code change, the NN from this embodiment is designed to detect that error.

Application 2—Restoration Production Pipeline

As a further application, the NN can be used outside of regression testing, and be applied as a QA step in production. At present, a qualified person must manually inspect the 3D data associated with the creation of the dental appliance. There are several stages of the fabrication process at which these data must be validated.

In one embodiment, a NN is used to validate the correctness of a "mold parting surface," which is an important component of the restoration appliance. It is important that the parting surface be formed correctly. This new NN examines the parting surface on a tooth-by-tooth basis, observing the manner in which the parting surface bisects each tooth.

Component Generation and Placement

These embodiments operate on the outputs of the automation code. The automation code may embody some or all of the content of PCT Patent Application Number PCT/IB2020/054778, entitled "Automated Creation of Tooth Restoration Dental Appliances" and U.S. Provisional Patent Application No. 63/030,144, entitled "Neural Network-Based Generation and Placement of Tooth Restoration Dental Appliances." Some of those outputs are generated components. A non-exhaustive list of generated components includes: mold parting surfaces, gingival trim surfaces, facial ribbons, incisal ridges, lingual shelves, stiffening ribs, "doors & windows" and diastema matrices. Others of those outputs are placed components (e.g., prefab library parts that must be translated and/or rotated to align in certain ways with respect to a patient's tooth geometry). A non-exhaustive list of placed components includes: incisal registration features, vents, rear snap clamps, door hinges, and door snaps. A technician must inspect the automation outputs to ensure that the generated components are properly formed and that the placed library components are properly positioned. A NN from the present embodiment could be used to determine whether components are properly formed or placed. The advantage is to save time for the technician and potentially to produce a higher quality dental restoration appliance through discovering errors in the shapes or placements of components that the technician may overlook. There are certain components that are of special importance, such as the mold parting surface. The mold parting surface forms the basis for much of the subsequent formation of the appliance. If there is an error in the mold parting surface, there is great value in discovering the error and discovering the error early in the appliance creation process.

Machine Learning for Both Embodiments

Figure 9:
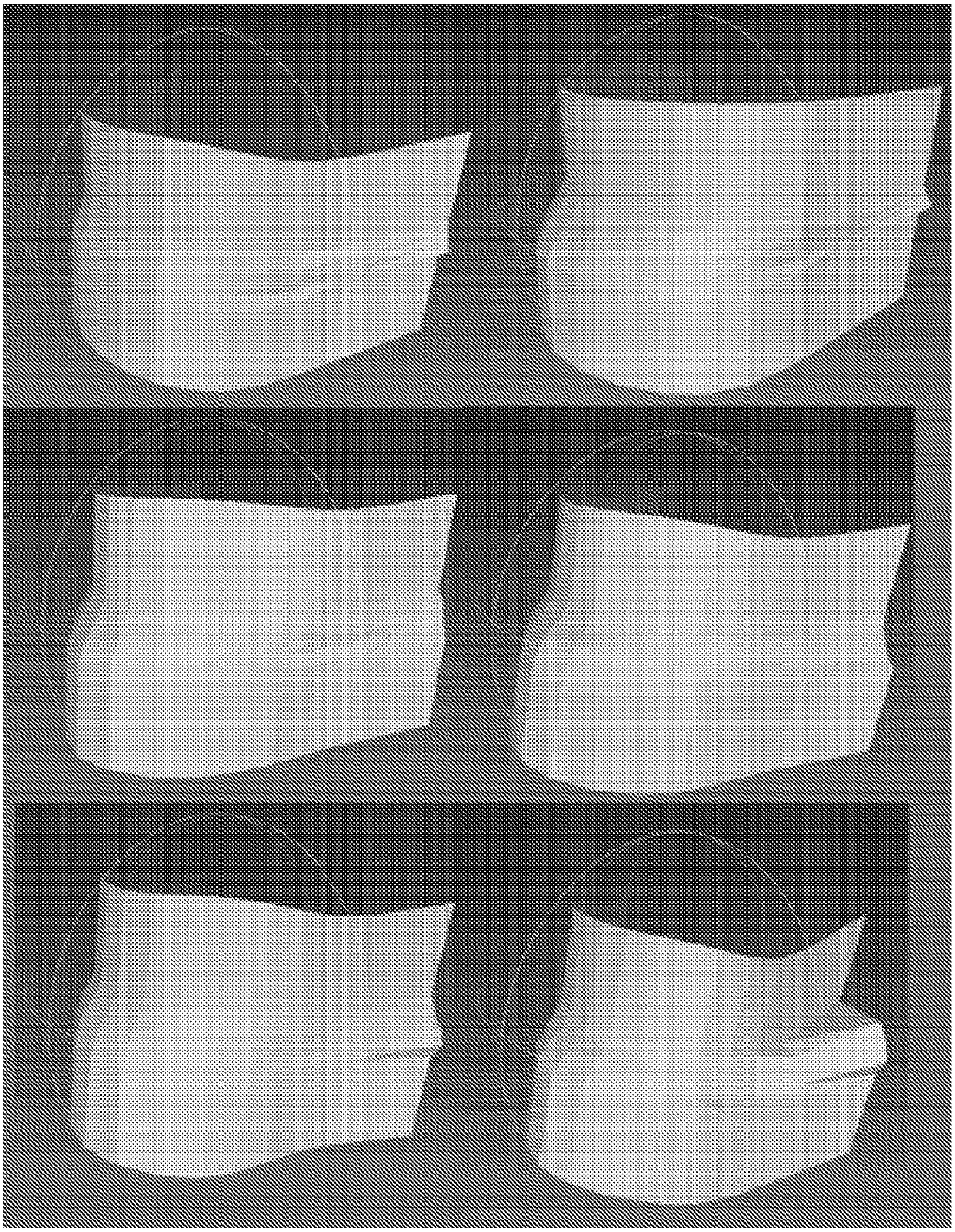
FIG. 9 shows six examples of "good" parting surfaces.
Figure 10:
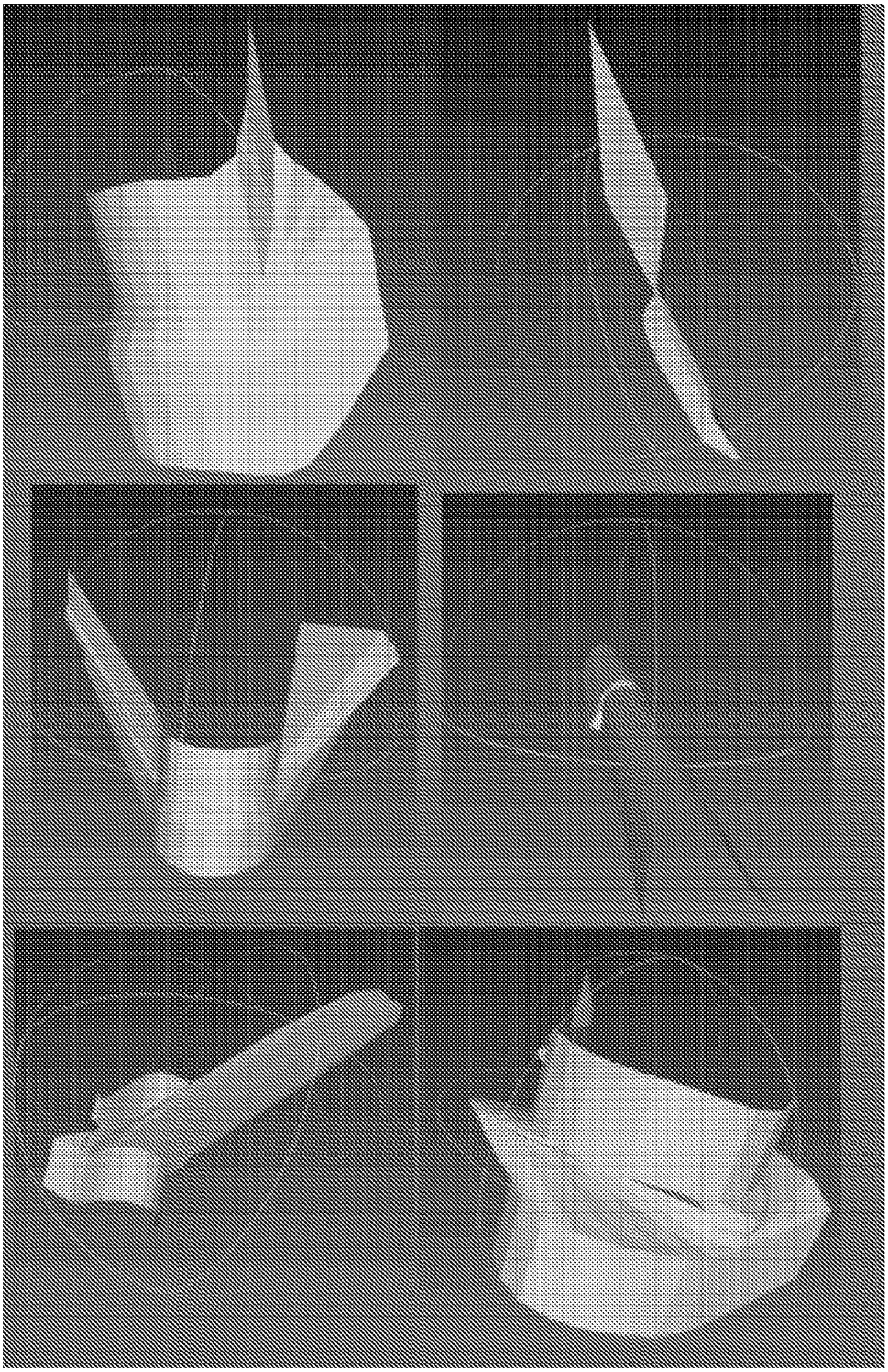
FIG. 10 shows six examples of "bad" or degenerate parting surfaces which were produced by temporarily corrupting specific lines of automation code.

A machine learning system has two stages of operation 1) training and 2) validation/operational use. The NNs in the embodiment must be trained on examples of good geometry and examples of bad geometry. Our first proof-of-concept used mold parting surfaces for the 3D geometry. FIG. 9 shows examples of "passing" parting surfaces. FIG. 10 shows examples of "non-passing" parting surfaces. The "non-passing" parting surfaces were produced by intentionally and temporarily modifying the automation code to introduce errors.

Training and Hold-Out Validation of Embodiment 1

The MeshCNN code was run (without modification) on this particular dataset of dental restoration appliance component parts and trained to distinguish between "passing" and "non-passing" parts. The training dataset contained 14 examples of "passing" parting surfaces and 14 examples of "non-passing" parting surfaces. Each one of the "non-passing" examples is a corrupted instance of one of the "passing" examples (i.e., where the code was changed to corrupt the generated parting surface). The test dataset contained 6 "non-passing" examples and 7 "passing" examples. The NN was trained for 20 epochs, achieving 100% accuracy on the held-out validation set. One epoch involves iterating through each example once. For the purposes of this proof-of-concept implementation, the parting surfaces were generated with a smaller number of triangles than the production parting surfaces, to save on the RAM required by the NN and enable the NN to run on an ordinary laptop.

The NN was then tested on a held-out validation dataset, i.e. data samples that were not involved in the training process, as is the custom in training machine learning models. 18 "passing" samples (i.e., good parting surfaces) were prepared, and 18 "non-passing" samples (i.e., bad parting surfaces) were prepared. The NN correctly classified 100% of these held-out validation data samples.

Figures for Embodiment 1

Figure 11:
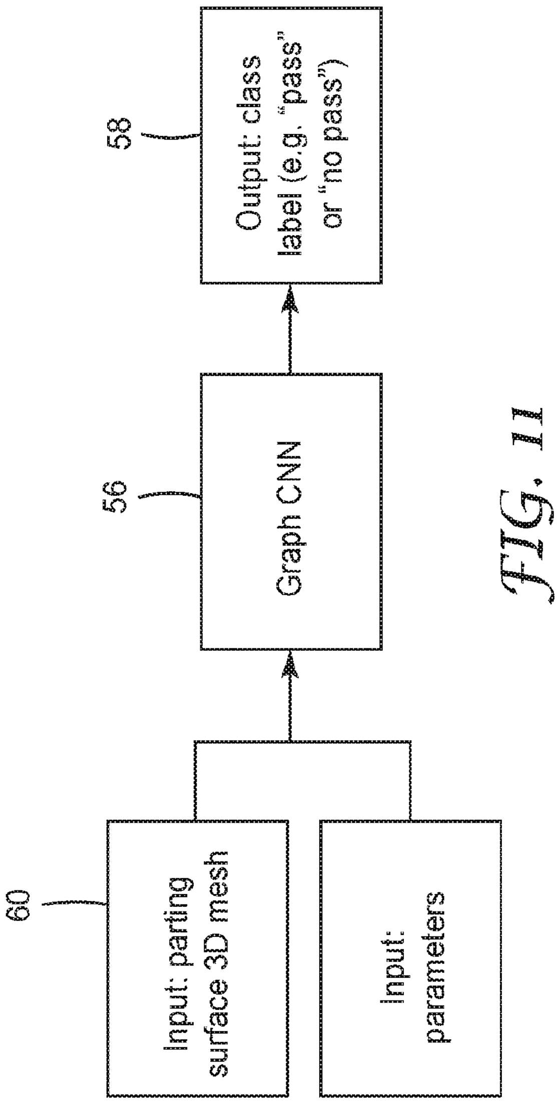
FIG. 11 is an operational use of the NN to distinguish between pass and non-pass mold parting surfaces.

FIG. 11 shows the elements of Embodiment 1, where a Graph CNN (GCNN) (56) is used to apply a pass/no-pass label (58) directly to a 3D mesh (60) to distinguish between pass and non-pass mold parting surfaces.

Figure 12:
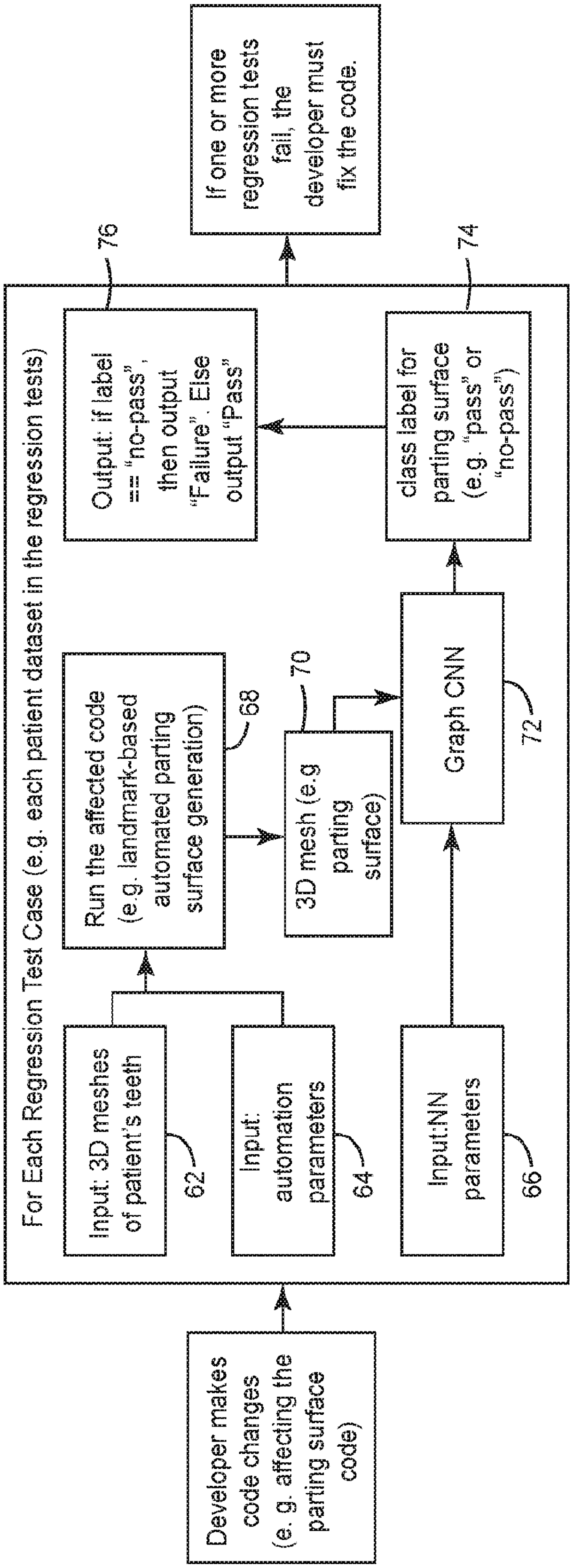
FIG. 12 is an operational use case for the purpose of regression testing one of the automation code modules (e.g., the parting surface generation code).

FIG. 12 is a flow chart that describes the operational use of the trained GCNN in the context of regression testing and code development, using Embodiment 1. In the context of code testing, both full-sized and downscaled meshes are acceptable. These meshes can be generated using fewer triangles than are required by the production system to create the appliance (e.g., the component may be generated with a factor of 10 fewer triangles). The flow chart in FIG. 12 provides the following method, as further described herein.

1. Inputs: 3D meshes (62) and automation parameters (64).
   a. Run the affected code (68).
   b. 3D mesh (70).
2. Input: NN parameters (66).
   a. Graph CNN (72).
   b. Class label for parting surface (74).
3. Output: If label=="no pass", the output is "Failure". Else output "Pass" (76).

Figure 13:
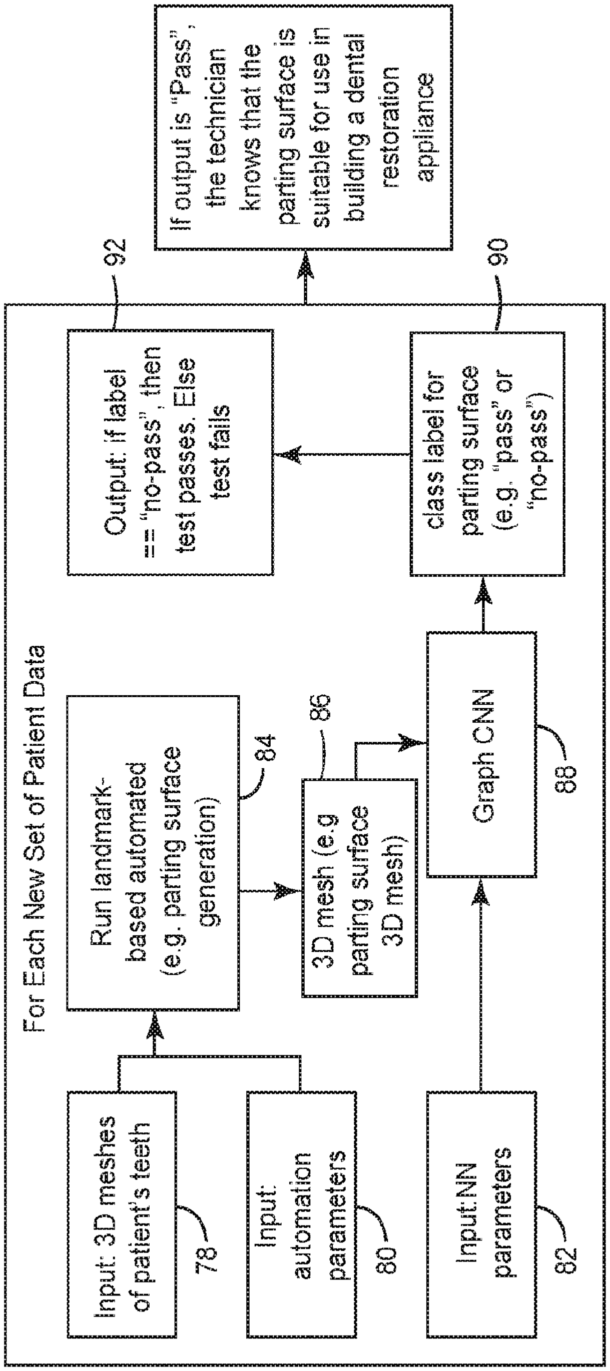
FIG. 13 is an operational use case to determine if a parting surface is suitable for use in a dental restoration appliance in the context of a production system.

FIG. 13 is a flow chart that describes the operational use of the trained GCNN in the context of a production manufacturing system, using Embodiment 1, where the fitness of a component must first be assessed before the component can be used to make the dental restoration appliance. In this latter application, the component must be full-sized (i.e., the mesh must contain the full number of triangles). The flow chart in FIG. 13 provides the following method, as further described herein.

1. Inputs: 3D meshes (78) and automation parameters (80).
   a. Run landmark-based automation (84).
   b. 3D mesh (86).
2. Input: NN parameters (82).
   a. Graph CNN (88).
   b. Class label for parting surface (90).
3. Output: If label=="pass", then test passes. Else test fails (92).

Figures for Embodiment 2

Figure 14:
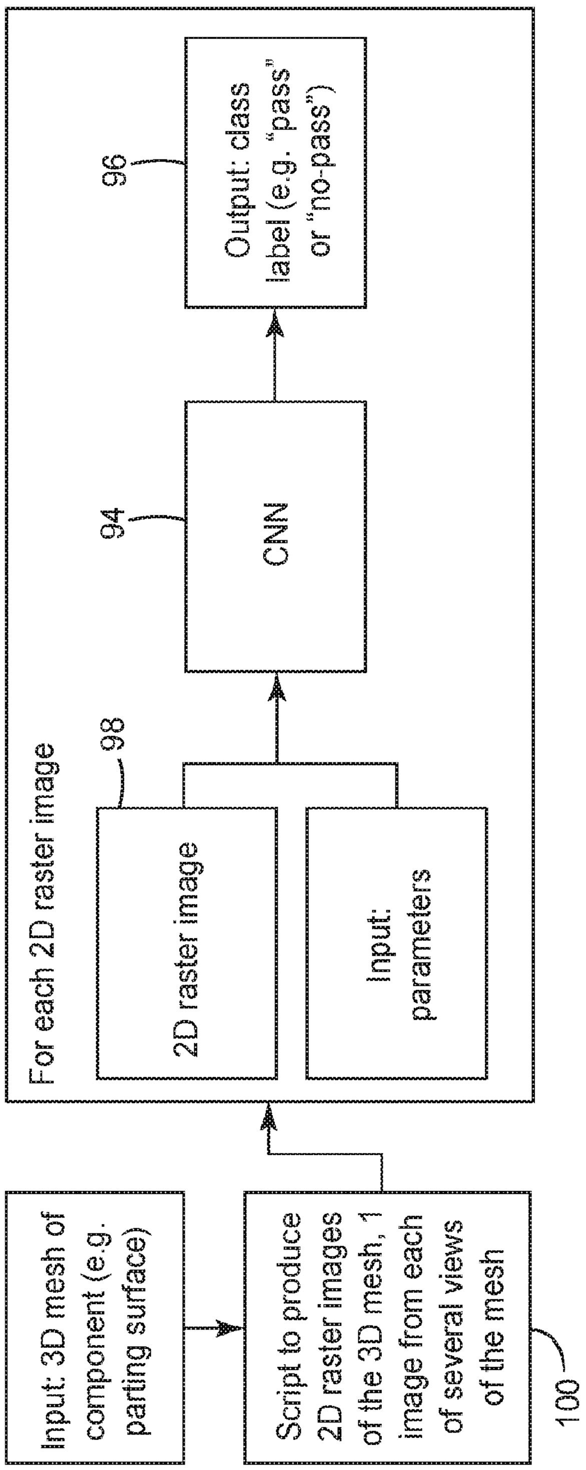
FIG. 14 is an operational use of the NN to distinguish between pass and non-pass mold parting surfaces.

FIG. 14 shows the elements of Embodiment 2, where a CNN (94) is used to apply a pass/no-pass label (96) to a mesh by analyzing a set of 2D raster images (98) of the 3D mesh, taken from various views (100) to distinguish between pass and non-pass mold parting surfaces.

Figure 15:
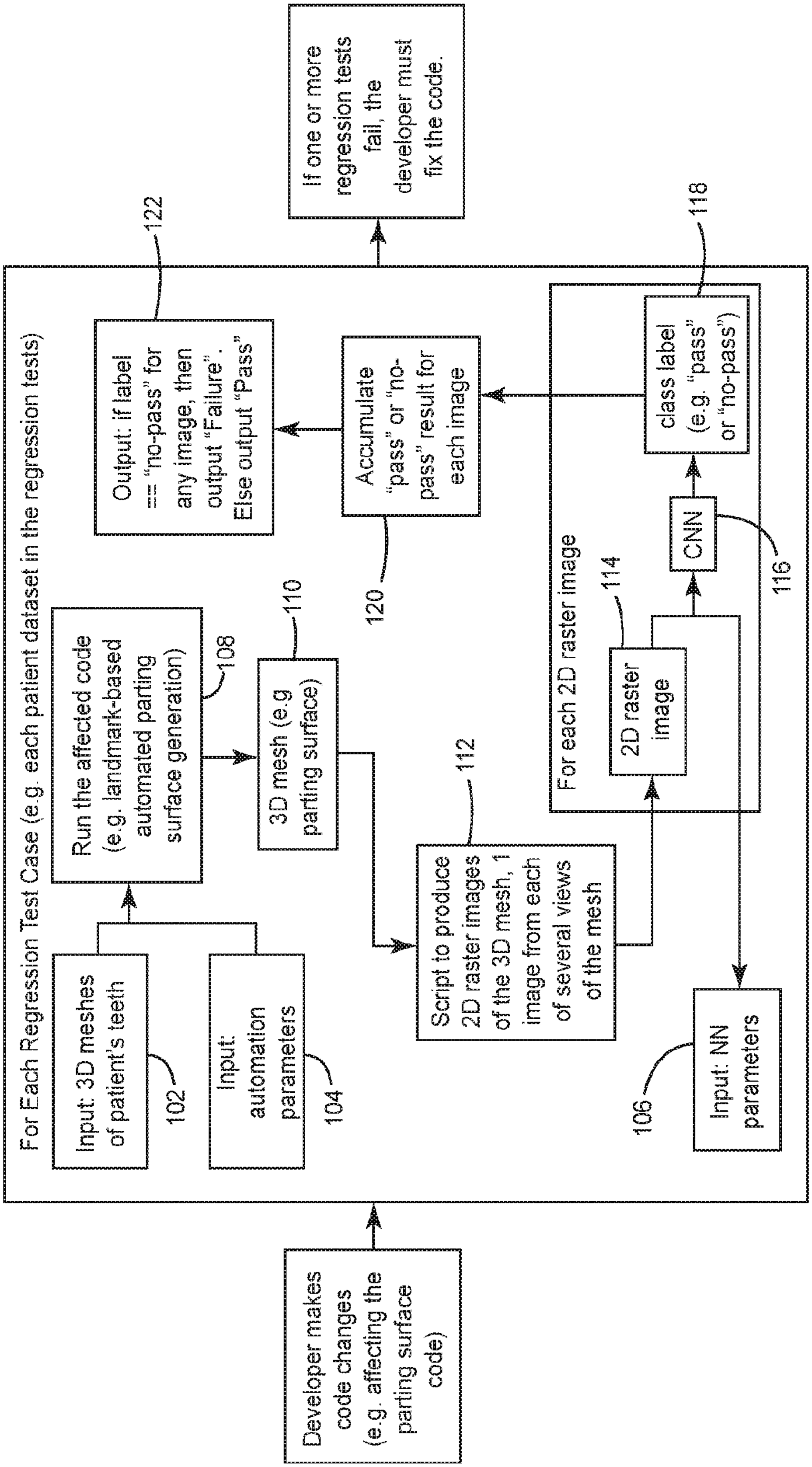
FIG. 15 is an operational use of NN to distinguish between pass and non-pass mold parting surfaces in the context of regression testing.

FIG. 15 is a flow chart that describes the operational use of the trained CNN in the context of a regression testing system, using Embodiment 2. The flow chart in FIG. 15 provides the following method, as further described herein.

1. Input: 3D meshes (102) and automation parameters (104).
   a. Run the affected code (108).
   b. 3D mesh (110).
   c. Script to produce 2D raster images of the 3D mesh, one image from each of several views of the mesh (112).
   d. 2D raster image (114).
2. Input: NN parameters (106).
   a. CNN (116).
   b. Class label (118).
   c. Accumulate "pass" or "no pass" result for each image (120).
3. Output: If label=="no pass" for any image, then output "Failure". Else output "Pass" (122).

Figure 16:
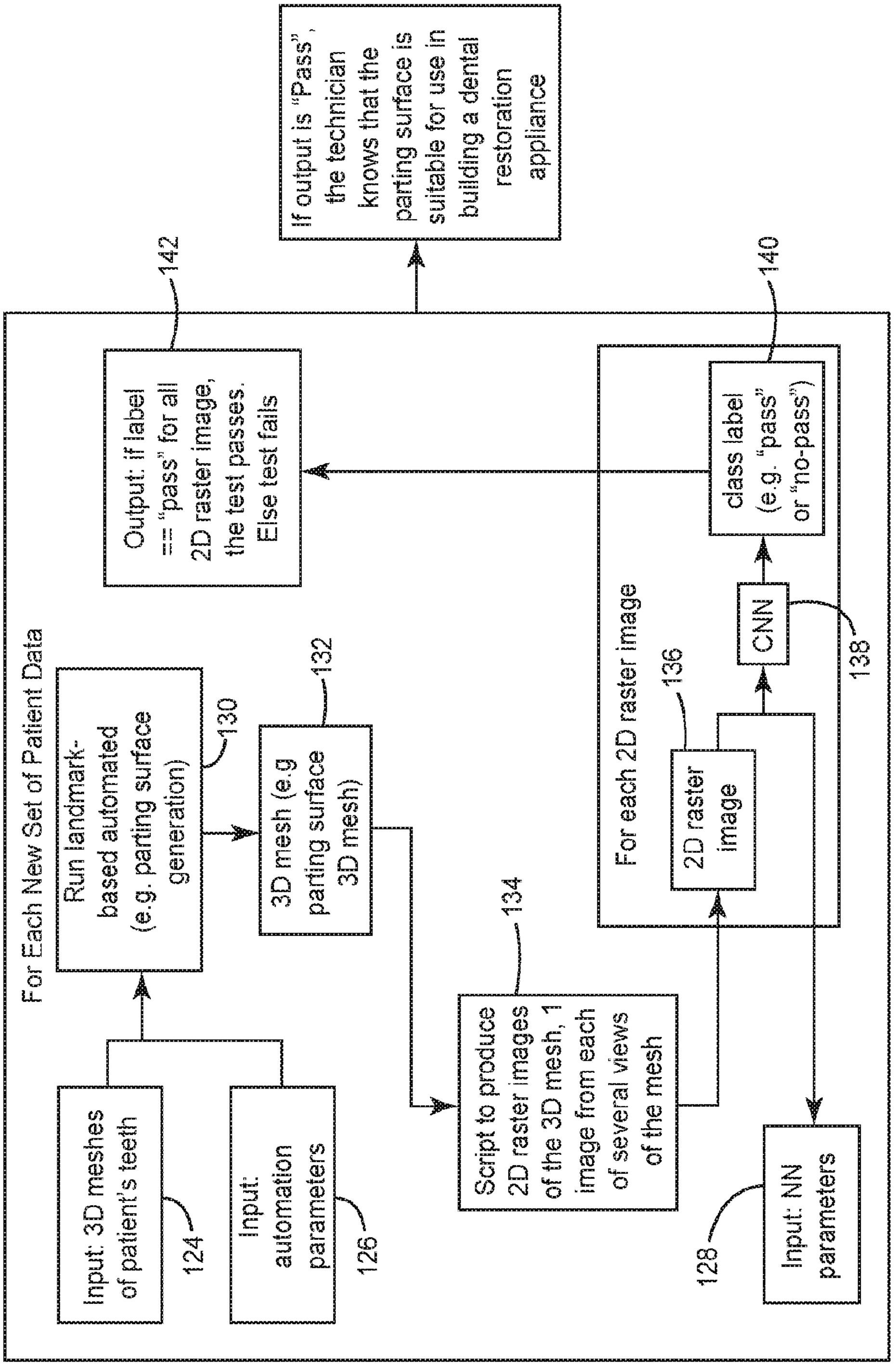
FIG. 16 is an operational use case to determine if a parting surface is suitable for use in a dental restoration appliance, in the context of a production system.

FIG. 16 is a flow chart that describes the operational use of the trained CNN in the context of a production manufacturing system, using Embodiment 2, where the fitness of a component must first be assessed before the component can be used to make the dental restoration appliance. The flow chart in FIG. 16 provides the following method, as further described herein.

1. Inputs: 3D meshes (124) and automation parameters (126).
   a. Run landmark-based automation (130).
   b. 3D mesh (132).
   c. Script to produce 2D raster images of the 3D mesh, one image from each of several views of the mesh (134).
   d. 2D raster image (136).
2. Input: NN parameters (128).
   a. CNN (138).
   b. Class label (140).
3. Output: If label=="pass" for all 2D raster images, then test passes. Else test fails (142).

Figure 17:
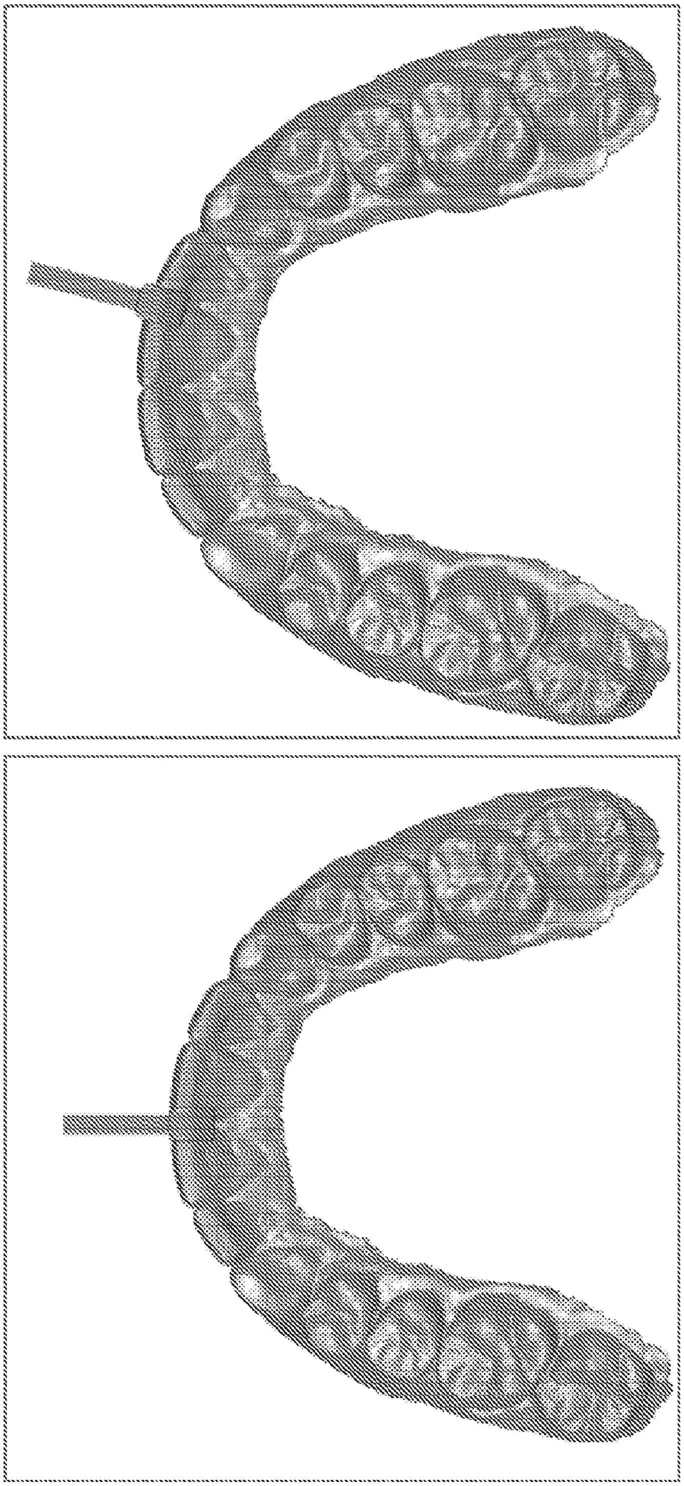
FIG. 17 shows 2D images of correct center clip placement (left) versus incorrect center clip placement (right).

FIG. 17 shows passing (left) and non-passing (right) 2D images of an arch with the center clip placed, where the center clip is placed correctly in the left image and incorrectly in the right image.

Validation

This embodiment is an extension of other embodiments described herein. This embodiment adds another item to the four items described above. This embodiment uses a NN to distinguish between two or more states of a representation of a component to be used in a dental restoration appliance for the purpose of determining if that component is acceptable for use in building the appliance, and if the component is found not to be acceptable, then the NN may in some embodiment output an indication of how the component should be modified to correct the geometry of the component.

The term "3D Mesh Component" is used to indicate a generated component from those described above, a placed component from those described above, or another 3D mesh that is intended for use with a rapid prototyping, 3D printing or stereolithography system. The component may be either a positive or negative feature which is integrated into the final part by a Boolean operation. The embodiment helps provide contextual feedback to automated feature generation, wherein there may be one algorithm or ruleset to create a component and one NN classification to check the quality of that component. The relationship between two components comprises a recursive "guess and check" mechanism to ensure acceptable results (create/generate>classify>regenerate>classify> . . . >final design).

This embodiment involves 3D Mesh Components in the context of digital dentistry and the automated production of dental appliances. Examples include: the restoration appliance, a clear tray aligner, bracket bonding tray, lingual bracket, restorative component (e.g., crown, denture), patient specific custom devices, and others. A dentist or provider could apply this embodiment to a digital design that the provider has made chairside in a dental clinic. Other embodiments are also possible, for example any application where automating a design could benefit from this embodiment, including the automated design of support structures for 3D printing and the automated design of fixtures for part fixturing. Additionally, a 3D printing laboratory could apply the embodiment to a prototype part, where the part is embodied as a 3D mesh. A manufacturing environment could apply this embodiment to custom 3D printed components where the NN input is derived from photos of the component, or screen captures of a mesh that is generated by scanning a physical part. This would allow the manufacturer to qualify output parts without the use of classical 3D analysis software, and may reduce or eliminate the effort required by a human expert to qualify the output parts. This embodiment could be applied by interaction of the user with the software, or this embodiment could be part of a background operation of a smart system that is providing input to the process without direct user intervention.

This embodiment is generally useful in the detection of problems with 3D meshes and the automated correction of those problems.

Figure 18:
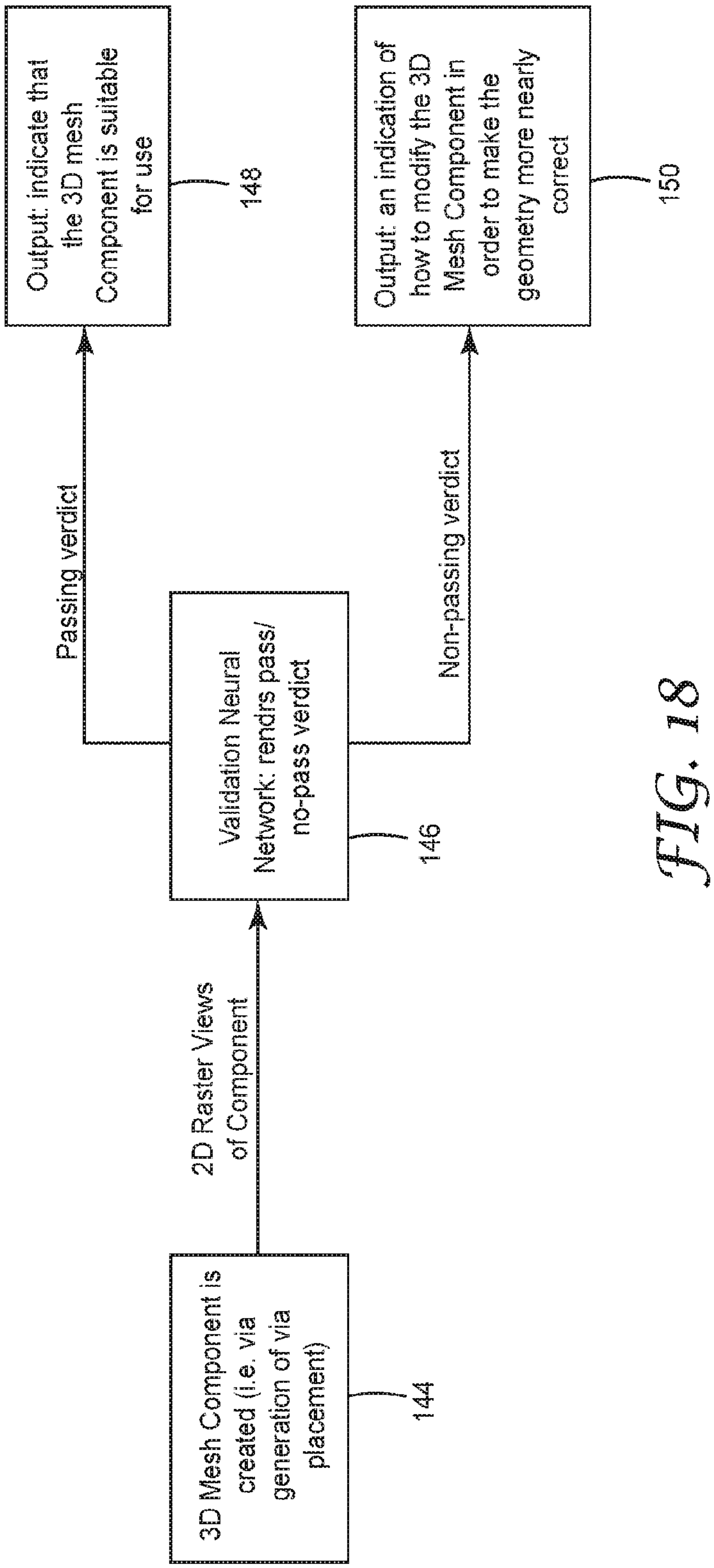
FIG. 18 is an operational use where a 3D mesh component is created.

FIG. 18 provides elements of this embodiment. A 3D Mesh Component is created (144). The validation neural network examines 2D raster images of the 3D Mesh Component (produced from various viewing directions) and determines whether the 3D Mesh Component passes (146). If the validation neural network renders a passing verdict, then the 3D Mesh Component is cleared for use in the intended application (e.g., a mold parting surface is cleared for use in a restoration appliance) (148). If the validation neural network determines that the 3D Mesh Component does not pass muster, then the validation neural network may in some embodiments output an indication of how to change the 3D Mesh Component (150).

A 3D Mesh Component is created through the following: automatic generation as described herein; automatic placement as described herein; manual generation by an expert; manual placement by an expert; or by some other means, for example, the use of a CAD tool or another setting in a rapid prototyping lab.

That 3D Mesh Component is entered into a validation neural network (e.g., of the kind described herein). The validation neural network renders a result on the quality of the 3D Mesh Component: either pass or not-pass. If the result is a pass, then the 3D Mesh Component is sent along to be used for its intended purpose (e.g., to be incorporated into a dental appliance). If the result is a not-pass, then the validation neural network may in some embodiments output an indication of how to modify the 3D Mesh Component in order to bring the 3D Mesh Component into closer conformance with expectations.

In the embodiment described below, a mold parting surface is examined in the vicinity to each of the teeth in an arch. If the mold parting surface intersects that tooth in the incorrect way, then the embodiment outputs and indication that the mold parting surface should be moved either lingually or facially in order to cause the mold parting surface to more cleanly bisect that tooth's outer cusp or incisal edge. The mold parting surface is intended to divide the facial and lingual portions of each tooth, which means that the mold parting surface should run along the outer cusp tips of the teeth. If the mold parting surface cuts too far in the lingual direction or too far in the facial direction, then the mold parting surface does not adequately divide the facial and lingual portions of each tooth. Consequently, the mold parting surface requires adjustment in the vicinity of that tooth. The software that automatically generates the mold parting surface has parameters which are operable to bias the facial/lingual positioning of the mold parting surface near that tooth. This embodiment produces incremental changes to those parameter values, in the proper directions, to make the mold parting surface more cleanly bisect each tooth.

This embodiment can mandate changes to the mold parting surface in the vicinity of some teeth (i.e., where the mold parting surface did not correctly bisect the tooth), but not in the vicinity of others (i.e., where the mold parting surface correctly or more cleanly bisected the tooth).

In this embodiment, there are two validation neural networks, one which is termed the Lingual-bias NN, and one which is termed the Facial-bias NN. Both of these neural networks are trained on 2D raster images of views of 3D tooth geometries, where the 3D tooth geometries are visualized in connection with a mold parting surface (see descriptions above in this Section I.D.). The mold parting surface is an example of a 3D Mesh Component, as previously defined.

Figure 19:
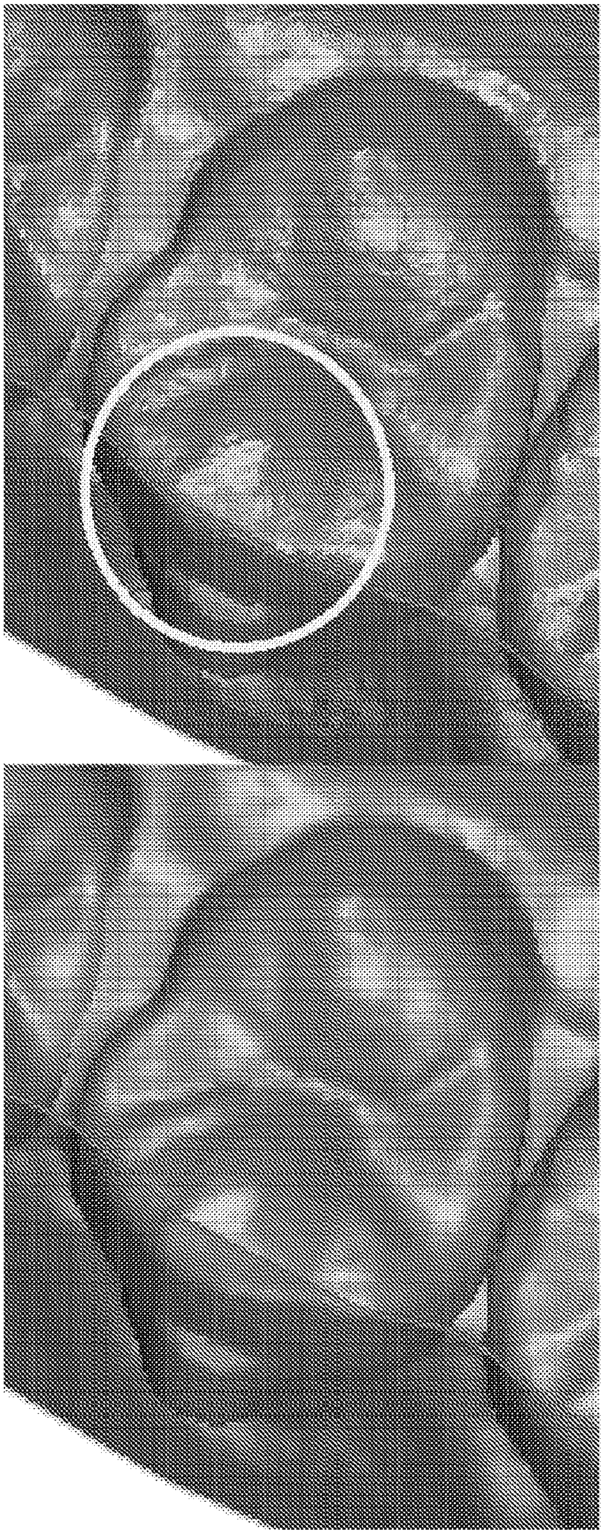
FIG. 19 (left side) shows a view of a tooth where that tooth has been correctly bisected by the parting surface and (right side) shows a view of a tooth where that tooth has been incorrectly bisected by the parting surface.
Figure 20:
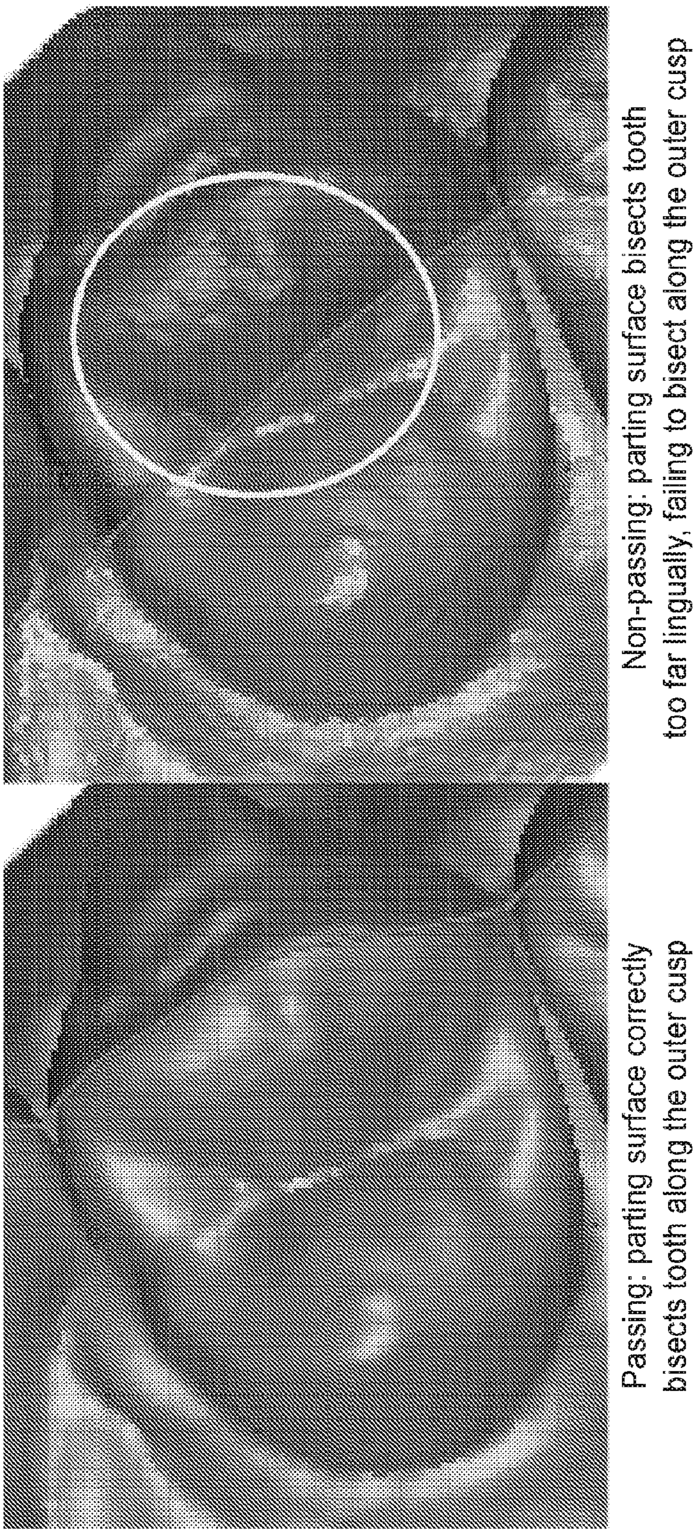
FIG. 20 shows the same kind of data samples as FIG. 19, except that the negative sample (left image) corresponds to a parting surface that encroaches too far lingually.

Options for creating the 2D raster images of teeth in relation to mold parting surfaces include the following:

1. The mold parting surface may be drawn into the scene as a 3D mesh, along with the teeth, which are also meshes.
2. The mold parting surface may be intersected with the teeth, resulting in a line which traces the contours of that intersection along the geometry of the teeth.
3. The mold parting surface may be intersected with the teeth in the fashion of a Boolean operation, whereby a portion of the teeth (e.g., either lingual or facial sides) is subtracted away from the scene. The two faces of the remaining geometry can be given colors or different shading, for the sake of clarity, for example blue and red colors, or dark and light shading.
4. The mold parting surface may be intersected with the teeth, resulting in color-coded tooth meshes. The portions of the tooth mesh which lie to the facial side of the mold parting surface are imparted, for example, the color red or a first shading. The portions of the tooth mesh which lie to the lingual side of the mold parting surface are imparted, for example, the color blue or a second shading different from the first shading. This option is shown in FIGS. 19 and 20.
5. Any or all of the above in conjunction.

FIG. 19 (left side) shows a view of a tooth where that tooth has been correctly bisected by the parting surface. FIG. 19 (right side) shows a view of a tooth where that tooth has been incorrectly bisected by the parting surface (e.g., the parting surface goes too far in the facial direction). FIG. 20 shows the same kind of data samples as FIG. 19, except that the negative sample (left side) corresponds to a parting surface that encroaches too far lingually.

Arbitrary views are considered for each of the above. In some embodiments, the use of a multi-view pipeline can enable the use of an arbitrary number of views with arbitrary camera positions and angles of rendered images.

Training:

The Lingual-bias NN is trained on two classes of image: 1) a class where the mold parting surface has been correctly formed and correctly bisects the teeth, and 2) a class where the mold parting surface has been incorrectly formed and does not correctly bisect one or more teeth. For this example, images were created which reflect several arbitrary views of each tooth in the arch. The views should show that tooth in relation to the parting surface, as the parting surface intersects the tooth (as per the list above). This case could use option 4 above, where the parting surface is intersected with the tooth and produces, for example, red and blue coloration or different shading on the tooth.

This embodiment trains the Lingual-bias NN to distinguish between the two classes of image (i.e., with passing parting surfaces and with non-passing parting surfaces). If the Lingual-bias NN renders a non-passing result on an input parting surface, then the methods know that the parting surface must have bisected the tooth in a manner that was too far lingual. The methods therefore output an indication that the parting surface came too far lingually for this tooth and should be moved slightly in the opposite direction when the mold parting surface is reworked by the automatic generation software (e.g., automatic generation software as described herein). The code to automatically generate the parting surface has a parameter for each tooth, which can bias the parting surface in either the lingual or facial direction. This parameter can be adjusted, so that the next iteration of the parting surface moves by a small increment in the facial direction for this tooth.

Other embodiments can in effect estimate the amount of surface movement in the facial direction using a regression network that works on images of the teeth. The regression network can be used to estimate the "transgression" in the lingual or facial region given an image of the teeth. Converting that transgression amount to the parameter can be feasible. This change in the feedback loop will lower the number of iterations/revisions for the methods.

The Facial-bias NN is trained with the same positive class images as the Lingual-bias NN, but the negative class images are generated using parting surfaces that come too far facially along the tooth. All the rest of the training details are substantially the same, except that when the Facial-bias NN renders a non-passing verdict, then the methods know that the mold parting surface came too far facially along the tooth, and the automatic generation software must be instructed to move the mold parting surface by an increment in the lingual direction.

In other embodiments, a neural network can be trained to isolate anomalies in the transgression on either of the lingual or facial directions. Such a NN has the capability of highlighting what were the most salient parts of the mesh/image of the arch for its inference.

In some embodiments, a regression network may be used for estimating the amount of transgression on the facial side and adjusting the corresponding parameter accordingly.

Operational Use of the Trained Neural Networks:

Each tooth is analyzed separately. Several images of each tooth are put through the pipeline, and pass/no-pass verdicts are rendered for each image. In cases where several images of a tooth/parting surface combination are rendered through this pipeline, there are different options for determining the result. In some embodiments, if at least one of the several views renders a non-passing verdict, then the methods output an indication that the parting surface needs adjustment in the vicinity of that tooth. In other embodiments, if some or a majority of the analyzed images renders a non-passing verdict, then the methods output an indication that the parting surface needs adjustment in the vicinity of that tooth.

In one embodiment, the validation neural network comprises of a Convolutional Neural Network (CNN). A CNN may embody a variety of different network configurations, including networks with a different number of layers, a different number of nodes per layer, differing use dropout layers, differing use of convolutional layers, differing use of dense layers, among other differences.

In other embodiments, the validation neural network may draw upon elements of a Multi-view CNN (MVCNN) architecture. As a brief summary, the input of the network uses an arbitrary number of images of a 3D scene. All the images pass through the shared copy of a feature extraction CNN. These features are then pooled using a view pooling mechanism and fed into a classification network, which is typically a fully connected network. The fundamental difference from a standard CNN is that this kind of an architecture can allow the use of multiple views of the same scene. Training works in a similar way with one change, that instead of passing in one image and label/value at a time, the methods pass in multiple views of mesh as images and label/value at a time.

In still other embodiments, the validation CNN (which works with 2D raster images) can be replaced with a neural network that directly works with 3D data, such as a MeshGAN. In other embodiments, the validation CNN (which works with 2D raster images) can be replaced with a GraphCNN (which works directly on 3D data). In other embodiments, the validation CNN (which works with 2D raster images) can be replaced with a GraphGAN (which works directly on 3D data).

One example provides images of the tooth in relation to a mold parting surface into both 1) the Lingual-bias NN and 2) the Facial-bias NN.

1. If both neural networks render passing verdicts, then the mold parting surface is cleared to be used in the production of the restoration dental appliance.
2. If the Lingual-bias NN renders a non-passing verdict, and the Facial-bias NN renders a passing verdict, then the methods output an indication that the mold parting surface came too far in the lingual direction. The mold parting surface automatic generation software must adjust the mold parting surface by an increment in the facial direction in the vicinity of the tooth, when the next iteration of the mold parting surface is created.
3. If the Lingual-bias NN renders a passing verdict, and the Facial-bias NN renders a non-passing verdict, then the methods output an indication that the mold parting surface came too far in the facial direction. The mold parting surface automatic generation software must adjust the mold parting surface by an increment in the lingual direction in the vicinity of the tooth, when the next iteration of the mold parting surface is created.
4. If both the Lingual-bias NN and Facial-bias NN render non-passing verdicts, then the results are provided to human decision-maker, who decides whether the mold parting surface needs adjustment in the vicinity of the tooth.

The methods loop through each tooth, determining whether the mold parting surface is correctly positioned in relation to that tooth, or whether the mold parting surface needs adjustment in either the lingual or facial directions, in the vicinity of the tooth.

In other embodiments, the pair of NN comprising of the Lingual-bias NN and the Facial-bias NN, each of which is operable to perform 2-class classification, may be replaced with a single NN which is operable to perform 3-class classification. This 3-class classification NN would be trained on 2D raster images from 3 classes:

Class 0—Views of the color-coded tooth where the tooth has been bisected by a mold parting surface that has been intentionally modified to be too far lingual.

Class 1—Views of the color-coded tooth where the tooth has been bisected by a mold parting surface that is correctly formed.

Class 2—Views of the color-coded tooth where the tooth has been bisected by a mold parting surface that has been intentionally modified to be too far facial.

The 3-class classification NN would render predictions from this set of three class labels.

In other embodiments, an N-class classification NN could be employed to assign one of N possible class labels to each data sample, corresponding to N distinct states of the appliance component (i.e. a mold parting surface).

In other embodiments, both views from the facial and the lingual sides can be incorporated in one NN as opposed to having two separate NNs. In this case, a graphical convolution network would take the entire tooth mesh as an input and output one regression value which represents the amount of "radial" adjustment for that particular tooth. The input to such a NN (the original 3D scene) strictly has more information than a few arbitrarily rendered images rendered from the scene.

Figure 21:
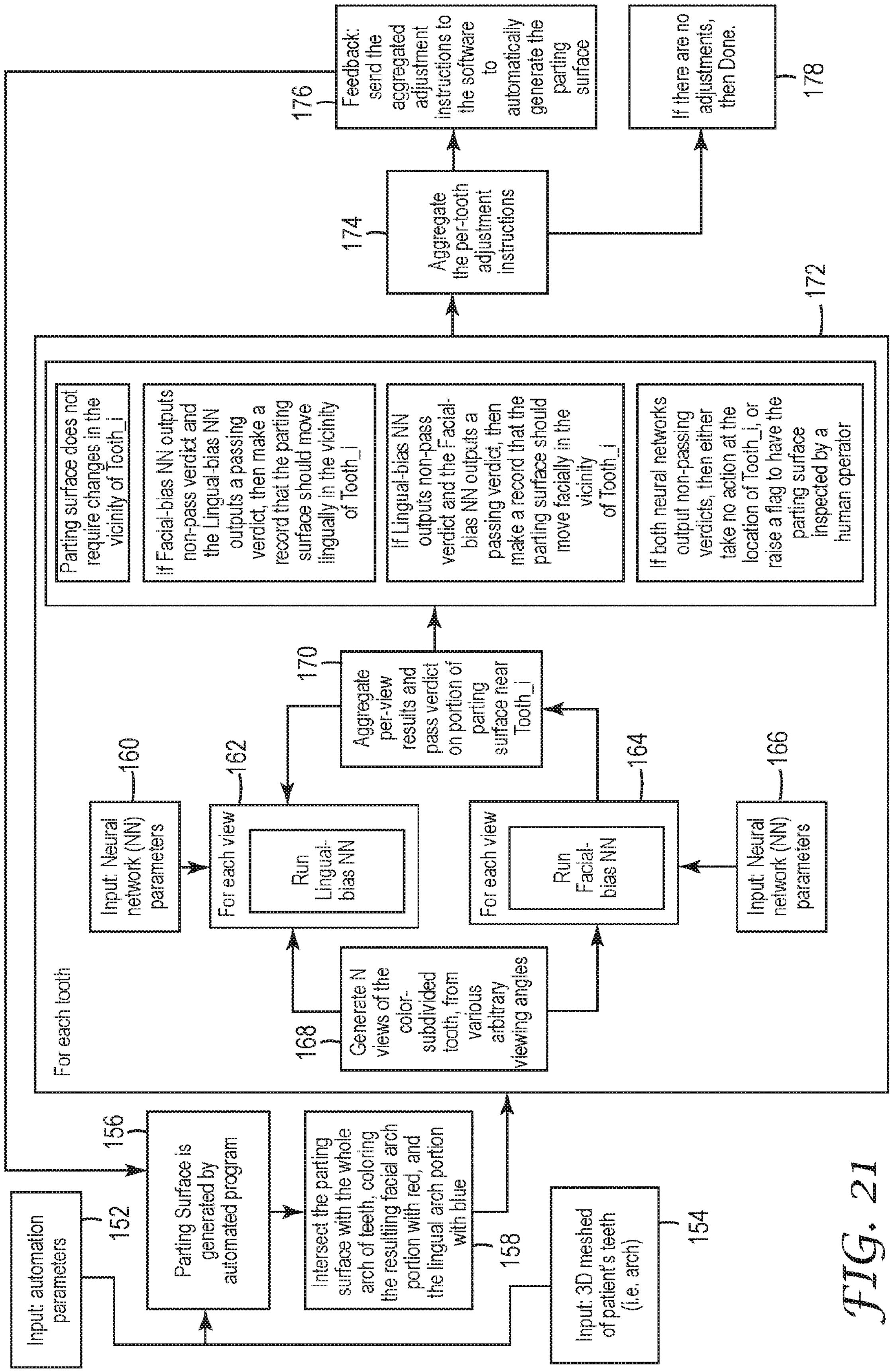
FIG. 21 is a more detailed use of FIG. 18, in the context of a mold parting surface.

FIG. 21 provides more details for the embodiment of FIG. 18, in the context of a mold parting surface. The flow chart in FIG. 21 provides the following method, as further described herein.

1. Inputs: Automation parameters (152) and 3D meshes of patient's teeth (154).
   a. Parting surface is generated by automation program (156).
   b. Intersect the parting surface with the whole arch of teeth, coloring the resulting facial arch portion with red and the lingual arch portion with blue (or other colors or shading for those portions) (158).
2. Generate N views of the color-subdivided tooth from various arbitrary viewing angles (168).
   a. Input: NN parameters (160).
      i. For each view, run Lingual-bias NN (162).
   b. Input: NN parameters (166).
      i. For each view, run Facial-bias NN. (164).
3. Aggregate per-view results and pass verdict on portion of parting surface near Tooth_i (170).
   a. Parting surface does not require changes in the vicinity of Tooth_i (172).
   b. If Facial-bias NN outputs non-pass verdict and the Lingual-bias NN outputs a passing verdict, then make a record that the parting surface should move lingually in the vicinity of Tooth_i (172).
   c. If Lingual-bias NN outputs non-pass verdict and the Facial-bias NN outputs a passing verdict, then make a record that the parting surface should move facially in the vicinity of Tooth_i (172).
   d. If both neural networks output non-passing verdicts, then either take no action at the location of Tooth_i, or raise a flag to have the parting surface inspected by a human operator (172).
4. Aggregate the per-tooth adjustment instructions (174).
   a. Feedback: Send the aggregated adjustment instructions to the software to automatically generate the parting surface (176), return to step 1.a. (156).
   b. If there are no adjustments, then Done (178).

The following is one embodiment of a neural network used in the implementation for the 2D raster image embodiment of the validation component:

```
model = Sequential([
  Conv2D(16, 3, padding='same', activation='relu',
    input_shape=(IMG_HEIGHT, IMG_WIDTH ,3)),
  MaxPooling2D( ),
  Dropout(0.2),
  Conv2D(32, 3, padding='same', activation='relu'),
  MaxPooling2D( ),
  Conv2D(64, 3, padding='same', activation='relu'),
  MaxPooling2D( ),
  Dropout(0.2),
  Flatten( ),
  Dense(512, activation='relu'),
  Dense(1)
 ])
```

One embodiment uses a neural network which is trained on 1) examples of correct appliance components and 2) examples of appliance components which have been systematically altered to be incorrect. This neural network distinguishes between correct and incorrect appliance components using multiple 2D renderings of the component, taken from different views.

The NN can be trained to distinguish between 1) a correct parting surface and 2) a parting surface which is too far lingual. The NN was tested on 3 patient cases, totally 54 teeth. In this test, 50 of the teeth yielded correct predictions and 4 teeth yielded incorrect predictions.

Figure 22:
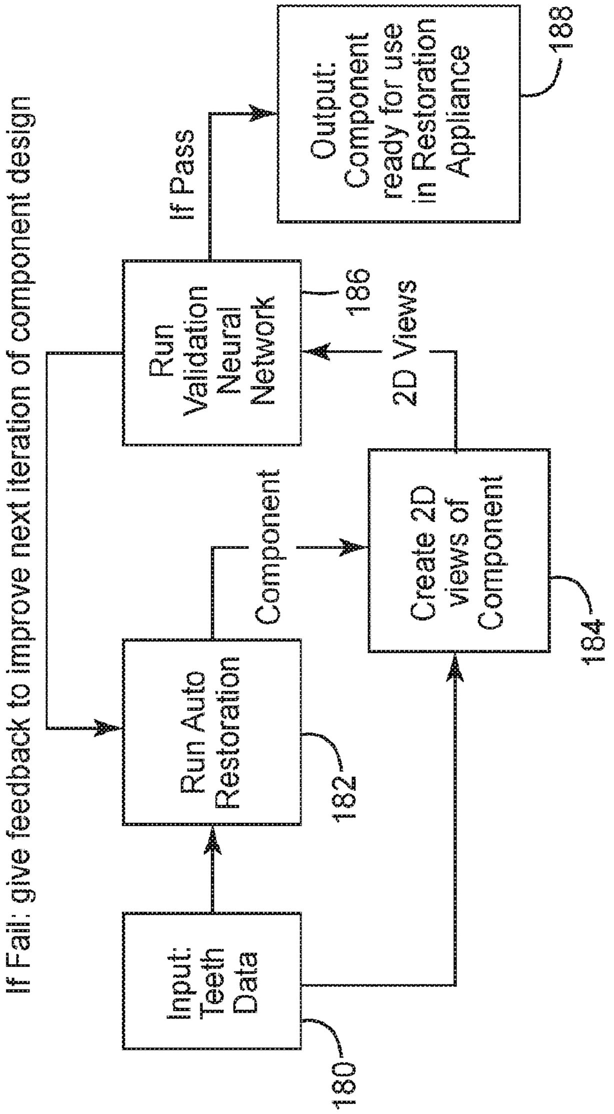
FIG. 22 is a validation process.
Figure 23:
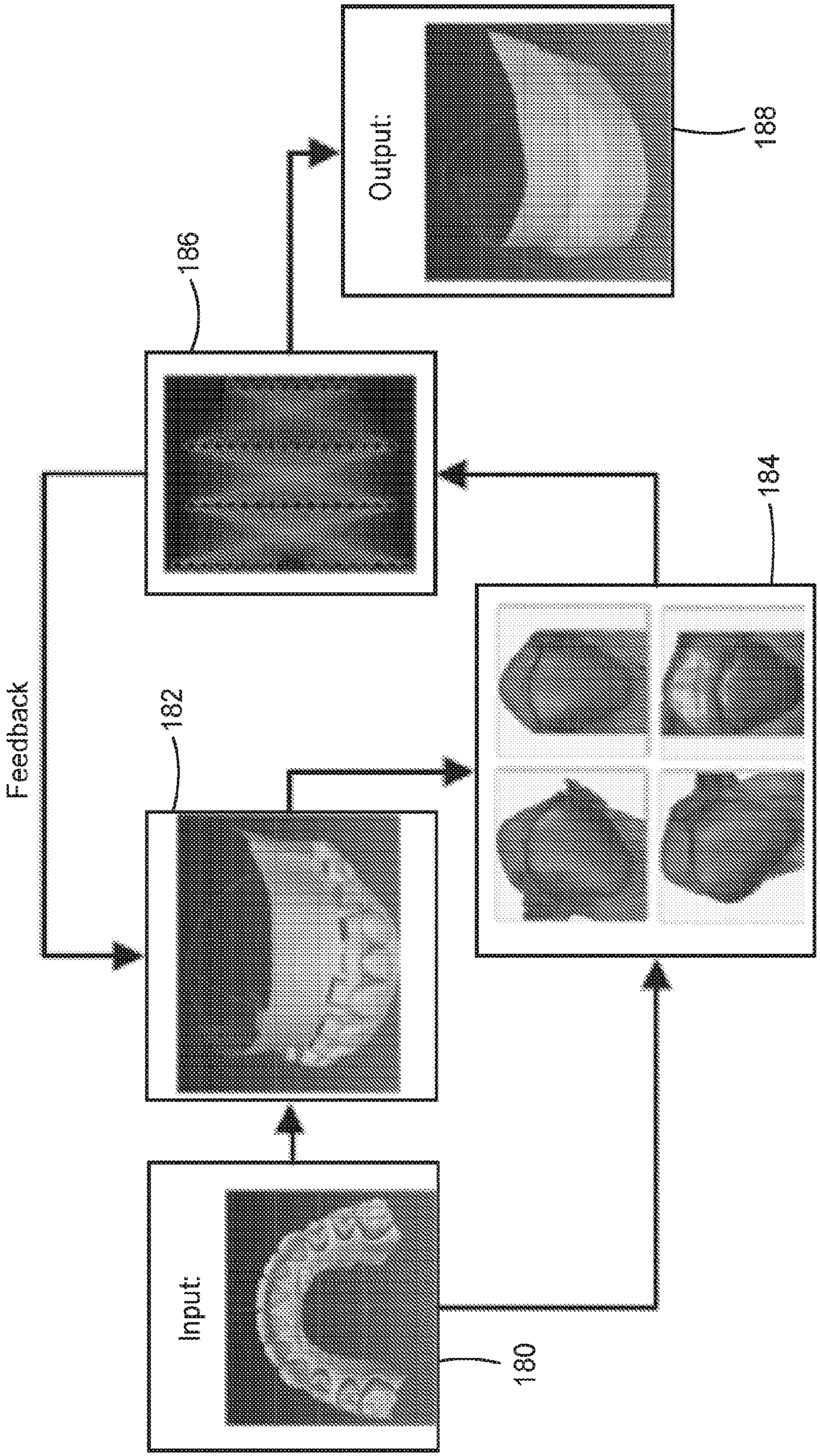
FIG. 23 is a pictorial representation of the process in FIG. 22.

FIG. 22 is flow chart of the following validation process, and FIG. 23 is a pictorial representation of the process.

1. Input: Teeth data (180).
2. Automatically generate appliance component (182).
3. Produce 2D views of the patient's teeth in relation to the appliance component (184).
4. Neural network (NN) validates the 2D views of the appliance component (186).
   a. If NN returns a pass, then component is cleared for use in the appliance.
   b. If NN returns a fail, then in some embodiments the feedback may be sent to the restoration automation code to refine the next iteration of the component design.
5. Output: Component ready for use in restoration appliance (188).

In this method, the neural network is trained to validate the correctness of a mold parting surface. This embodiment reflects 2-class classification, where the neural network was trained on two classes of data, i.e., where the parting surface is either:

Class 0: positioned too far lingually, or

Class 1: correct (neither too far lingual nor too far facial).

Figure 24:
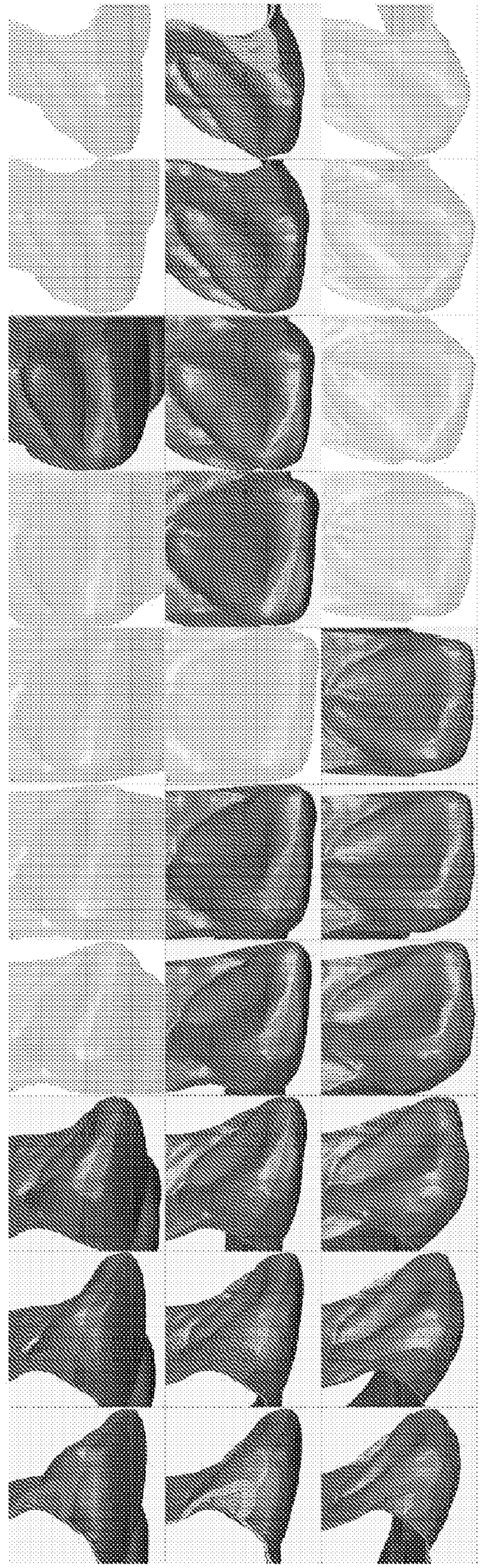
FIG. 24 shows thirty views of an upper left lateral incisor (tooth 10) that has been bisected by a parting surface.

The diagram in FIG. 24 shows 30 views of an upper left lateral incisor (tooth 10) that has been bisected by a parting surface. For this test case, the tooth was bisected by a parting surface that was modified to be 0.5 mm too far in the lingual direction. Other test cases are designed around a parting surface that has been modified to be 1.0 mm too far in the lingual direction. Still other test cases are designed around a parting surface which correctly bisects the tooth (i.e., is neither too far in the lingual direction nor too far in the facial direction).

Each of the 30 views (FIG. 24) of the bisected tooth was run through the neural network. The neural network rendered a prediction for each view, concluding that the parting surface as shown in that view was either: Class 0 "too far lingual" or Class 1 "correctly positioned". In this test case, the ground truth labels for all views were the same: "Class 0". However, due to the ambiguity of the geometry of this particular parting surface, the neural network failed to classify several of the views correctly (i.e., assigned the label of "Class 1" to those views). These erroneously predicted views are shown in greyed-out coloration in the diagram. This effect in the images was achieved using an alpha channel. There are 11 such views for which the neural network rendered predictions that did not match the ground truth labels. The remaining 19 full-color views are the views where the neural network yielded predictions that matched the ground truth labels. The validation system rendered a majority vote of the 19 out of 30 to conclude that the parting surface was too far lingual. This was a test case where ground truth data were available.

This method of visualizing the results of the neural network is advantageous because the method organizes the large number of views of the tooth for a single test case and enables a human to quickly scan through and grasp the results of the test case.

Figure 25:
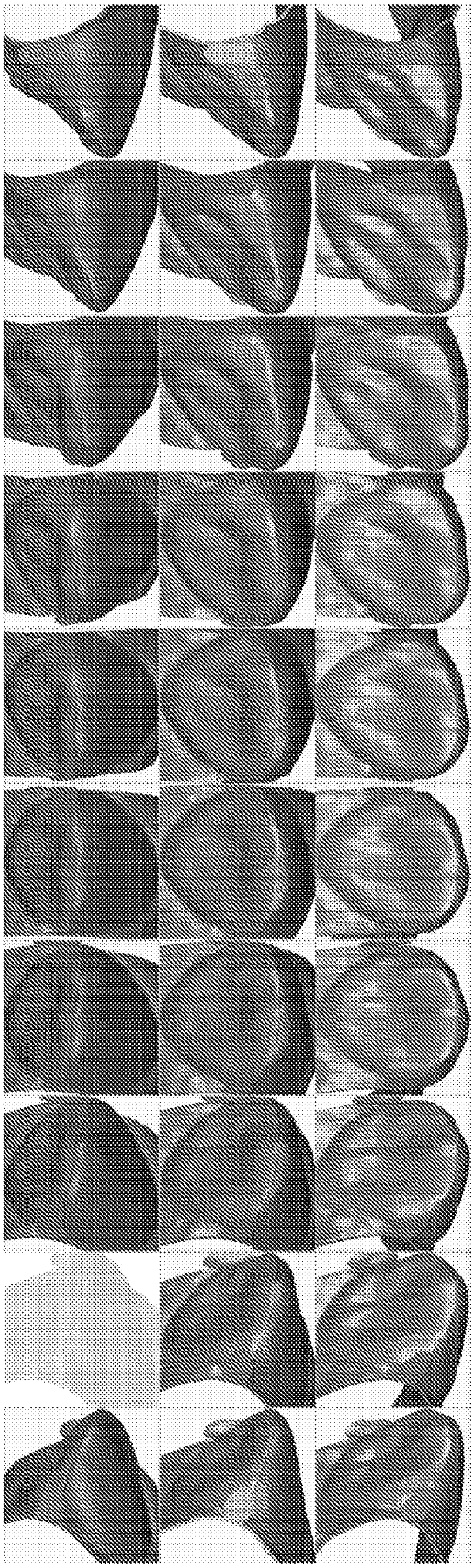
FIG. 25 shows thirty views of an upper right cuspid (tooth 6) that has been correctly bisected by a parting surface.

The diagram in FIG. 25 shows 30 views of an upper right cuspid (tooth 6) that has been correctly bisected by a parting surface. In this case, the neural network only rendered an incorrect prediction for one of the views (see the greyed-out view near the upper left side of the figure). For this test case also, a majority vote of 29 out 30 yields the result that the parting surface is correct.

The neural network is trained on ground truth data of the following 3 classes.

Class 0: parting surface is intentionally modified to be positioned too far lingually.

Class 1: correct (neither too far lingual nor too far facial).

Class 2: parting surface is intentionally modified to be positioned too far facially.

The various embodiments described herein can be used in a variety of different neural networks. Embodiment 2 uses a CNN. Embodiment 1 of uses a Graph Convolutional Neural Network (GraphCNN). Other embodiments may involve elements derived in whole or in part from other types of neural networks, including the following: Perceptron (P); Feed Forward (FF); Radial Basis Network (RBF); Deep Feed Forward (DFF); Recurrent Neural Networks (RNN); Long Short-Term Memory (LSTM); Gated Recurrent Unit (GRU); Auto Encoder (AE); Variational Auto Encoder (VAE); Denoising Auto Encoder (DAE); Sparse Auto Encoder (SAE); Capsule Autoencoder (CAE); Stacked Capsule Autoencoders (SCAE); Deep Belief Network (DBN); Deep Convolutional Network (DCN); Deconvolutional Network (DN); Generative Adversarial Network (GAN); Liquid State Machine (LSM); and Neural Turing Machine (NTM).

The GraphCNN can operate on dental data which are provided in a 3D form, such as a 3D Mesh. The mesh includes both vertices and instructions on how to arrange the vertices into faces. Implicit in the definitions of the faces is information about the edges which connect the vertices.

The CNN can operate on dental data which are provided in the form of 2D raster images. The 2D raster images can use color or shading to highlight areas of interest within the dental anatomy (e.g., the use of red and blue coloration, or light and dark shading, to denote the facial and lingual portions of a tooth which result from application of the mold parting surface to that tooth).

These neural networks may be trained on data which has undergone augmentation. In the case of the 3D mesh data, augmentation can involve stochastic or deterministic transforms that are applied to the vertices or the faces, so as to change the shape of the 3D mesh, but not alter the essential identity of the mesh. This variation in the mesh shape can help a classifier to avoid overfitting when used as training data. In the case of 2D raster images, the images may be resized, stretched, rotated, sheared or undergo the introduction of noise. Likewise, with the 3D data, these 2D data augmentations to the training data can help the neural networks avoid overfitting at training time.

The neural networks described herein can incorporate various activation functions, such as RELU. Other activation functions include: binary step, identity, logistic, and Tan H. The neural networks can incorporate down sampling techniques, such as pooling and max-pooling. The neural networks can reduce overfitting and reduce generalization error using regularization techniques such as dropout.

Other Validation

The following are other examples of dental appliances which may benefit from the validation techniques described herein.

1. Custom Orthodontic Appliances (e.g., Lingual Brackets)

In some embodiments, the validation techniques described herein can be applied to the design of custom lingual brackets. Digital 3D views of lingual brackets placed on teeth could be used to train a validation NN that would render a pass/fail verdict on the lingual bracket design. This feedback could be acted upon by a trained technician or sent to the automation software that generated the lingual bracket to improve the design of the next iteration of the lingual bracket. For lingual brackets, a bonding pad is created for a specific tooth by outlining a perimeter on the tooth, creating a thickness to form a shell, and then subtracting-out the tooth via a Boolean operation. Bracket bodies are selected from a library, placed on the pad and united to the pad via Boolean addition. Various bracket components (e.g., hooks and wings) are adjusted to best adapt to the particular geometry of the tooth and gingiva and are united into the bracket body to complete the digital design of the bracket which is exported as a 3D geometry file. In some embodiments, the STL format may be used for the 3D geometry file.

2. Custom Indirect Bonding of Non-Custom Brackets

Brackets are selected from a library and custom positioned on a tooth. Fine adjustments are made based on local tooth anatomy in the bonding region and some customization of torque and rotation is possible through compensation within the adhesive bond line between the tooth and the bracket. A NN is trained to recognize discrepancies in the bracket placements, where those placements were either automated placements or technician-produced placement.

3. Aligners or Clear Tray Aligners (CTAs)

In other embodiments, the validation techniques described herein can be applied to the design of CTAs, for example the 3D data that are used to design aligner trays. An example of such data is a 3D representation (e.g., 3D mesh) of the patient's teeth called a "fixture model" that is then sent to a 3D printer. Parameters such as the location of the trim line, the geometry and position of attachments, bite ramps or slits can be validated. The trim line is where the aligner is trimmed during thermo forming. More complex features are possible in direct 3D printed aligners (local thickness, reinforcing rib geometry, flap positioning, etc.) can be subject to the validation techniques described herein.

A digital 3D model of a patient's teeth and gums showing the trim line could be used to train a validation NN that would render a pass/fail verdict on the CTA. This feedback could be acted upon by a trained technician or sent to the automation software that generated the CTA to improve the design of the next iteration of the CTA. The CTAs are a series of removable, nearly invisible plastic trays that are shaped to move the patient's teeth progressively along a series of predetermined positions.

Other dental appliances which can be validated using the validation techniques described herein include data or structures related to implant placement, or other types of dental restoration (such as veneer, crown, or bridge) design.

Also, the validation techniques described herein could be used to validate a bracket placement, including either or both of a manual placement by a human expert and an automatic placement by an algorithm.

II. Vertex and Edge Classification

These embodiments include, for example, the following: using a machine learning segmentation module to provide the capability of segmenting out hardware from scanned arches.

The hardware can be in the form of brackets, braces, or other complicated external artifacts.

A. Segmentation

A deep learning model is used to automatically segment teeth from a 3D mesh. This process can be divided into two steps: model development/training, and model deployment. During training (flow chart 1 in FIG. 26), both unsegmented and segmented digital 3D models from multiple patients are input into a deep learning model, which is optimized to learn patterns that minimize the difference between predicted and actual tooth segmentations. During model deployment (flow chart 2 in FIG. 26), the trained deep learning model is used to generate a segmentation prediction for new never-before-seen case data.

Figure 26:
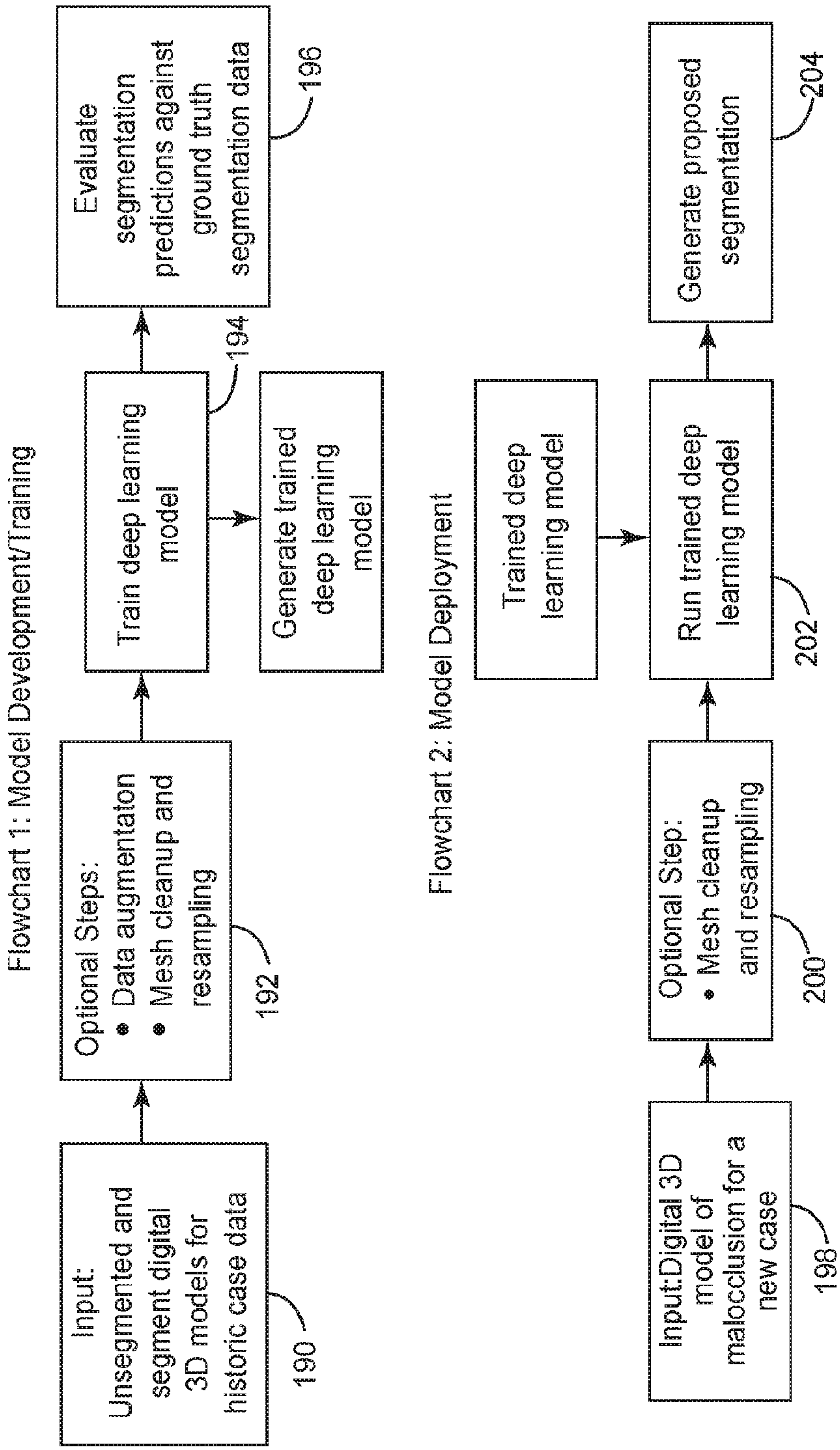
FIG. 26 is a segmentation process.

The flow chart in FIG. 26 provides the following methods, as further described herein. Model Development/Training:

1. Input: Unsegmented and segmented digital 3D models for historic case data (190).
2. (Optional) Data augmentation, and mesh cleanup and resampling (192).
3. Train deep learning model (194).
4. Evaluate segmentation predictions against ground truth segmentation data (196).

Model Deployment:

1. Input: Digital 3D model of malocclusion for a new case (198).
2. (Optional) Mesh cleanup and resampling (200).
3. Run trained deep learning model (202).
4. Generate proposed segmentation (204).

As more data is acquired, machine learning methods and particularly deep learning methods start performing can exceed the performance of explicitly programmed methods. Deep learning methods have the significant advantage of removing the need for hand-crafted features as they are able to infer several useful features using a combination of several non-linear functions of higher dimensional latent or hidden features, directly from the data through the process of training. While trying to solve the segmentation problem, directly operating on the malocclusion 3D mesh might be desirable.

Deep Learning for Tooth Segmentation from the Gum:

A deep learning model performs tooth segmentation from 3D mesh data using MeshCNN. MeshCNN is a general-purpose deep neural network for 3D triangular meshes, which can be used for tasks such as 3D shape classification or segmentation. This framework includes convolution, pooling, and unpooling layers which are applied directly on mesh edges and has an advantage over other approaches because it is invariant to mesh rotation, scale, and translation changes. Deep learning algorithms including MeshCNN have two main development steps: 1) Model training and 2) Model deployment.

1. Model Training

Model training makes use of multiple unsegmented and segmented digital 3D models for historic case data. Prior to use, these 3D models may undergo some mesh cleanup and resampling. For our case data, many standard mesh cleanup operations were performed including hole filling, degenerate edge removal, island removal, etc. For computational efficiency during model training, mesh decimation was also performed to decrease the number of faces to a smaller number (roughly 3000). To increase the number of 3D mesh samples used to train the deep neural network, data augmentation techniques including nonuniform scale, vertex shift, and edge flipping were used. The unsegmented meshes as well as labels for each mesh edge were input into the MeshCNN framework. As is standard for deep learning models, the model was trained through a process that iteratively adjusts a set of weights to minimize the difference between predicted and actual segmentation labels. The trained model was then evaluated by predicting segmentation labels for a reserve set of cases that were not used during training and measuring accuracy. The model achieved 97% accuracy in correctly identifying edges as either belonging to teeth or gums.

2. Model Deployment

The model deployment stage makes use of the trained model that was developed during Step 1: Model Training. The trained model takes as input an unsegmented 3D scan for a new case. Any mesh cleanup or resampling that was performed on 3D meshes during the model training stage should also be applied to the new 3D scan data. The trained model outputs a set of labels that indicate, for each edge, whether the edge belongs to the "gum" or "tooth" class.

Figure 27:
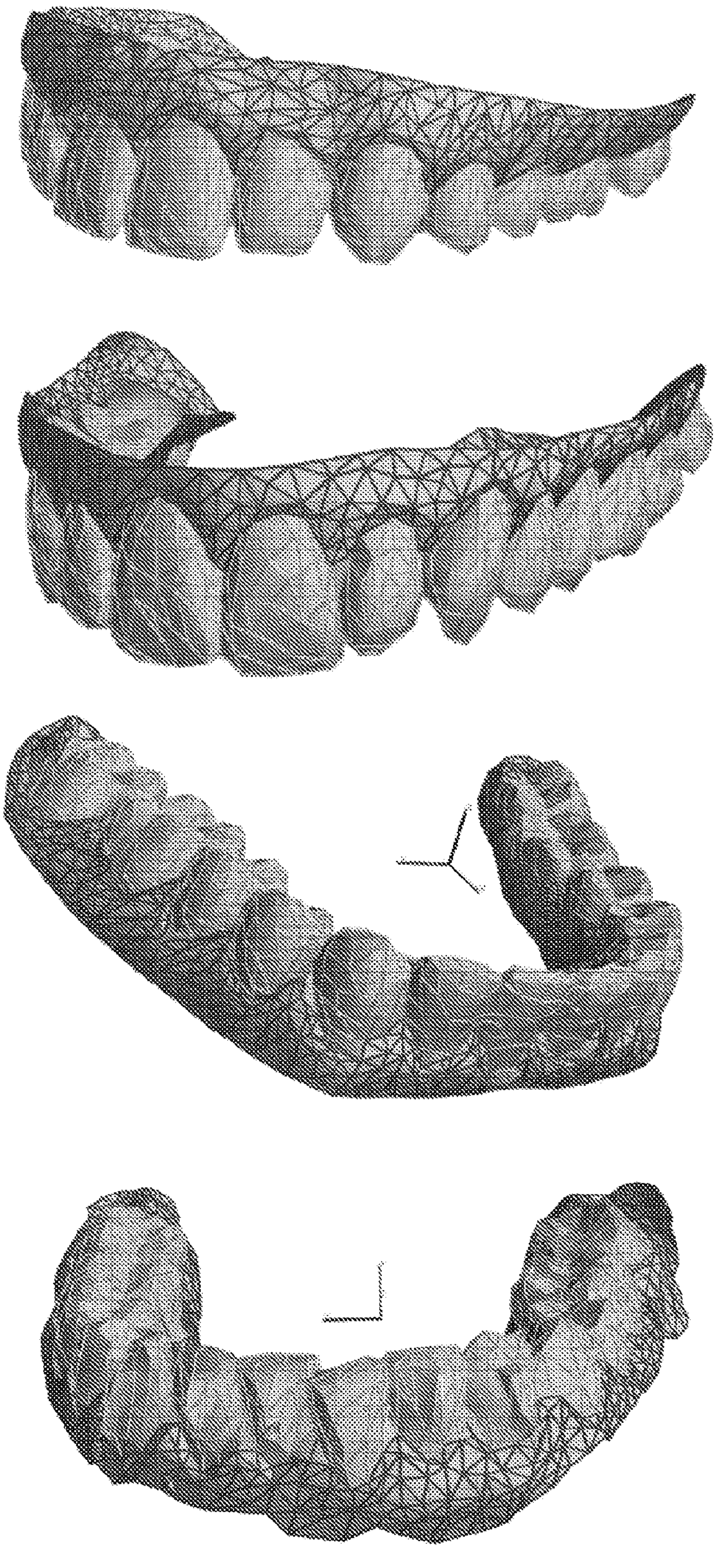
FIG. 27 shows examples of segmentation results for some upper and lower arches.

Examples of segmentation results for some upper and lower arches are shown in FIG. 27.

Extension to Tooth Type Classification:

The segmentation results created above were generated by assuming that edges in the mesh belonged to one of two classes: (1) tooth, (2) gum. Alternatively, the edges could be labeled as belonging to one of multiple classes, for example:

1. By tooth type: (1) molar, (2) premolar, (3) canine, (4) incisor, (5) gum.
2. By tooth type and arch: (1) upper arch molar, (2) upper arch premolar, (3) upper arch canine, (4) upper arch incisor, (5) lower arch molar, (6) lower arch premolar, (7) lower arch canine, (8) lower arch incisor, (9), gum.
3. By tooth number: (1) gum, (2) tooth 1, (3) tooth 2, . . . , (33) tooth 32.

A deep learning model, such as MeshCNN, can be trained to label edges as belonging to one of multiple classes.

B. Segmentation Using Inferences

This method uses GDL to infer parts or segments of an object scan using different scanning hardware. This method uses a machine learning approach to infer a segmentation of an input point cloud. These segments are corresponding to the individual teeth and gingiva (gums). The model was trained using a dataset of point clouds acquired using intra-oral scans (henceforth referred to as data points), embodied as collections of (x,y,z) coordinates of each point in the point cloud and the associated segmentation of the points into teeth and gingiva.

This map can later be used in other geometric operations. For instance, in the case of digital orthodontics, this model could be used to standardize the incoming point cloud in a coordinate system that is conducive for processing without the need for having manual input in the loop. This effectively and significantly reduces the processing time for each case and also reduces the need to train human workers to perform this task.

Figure 28:
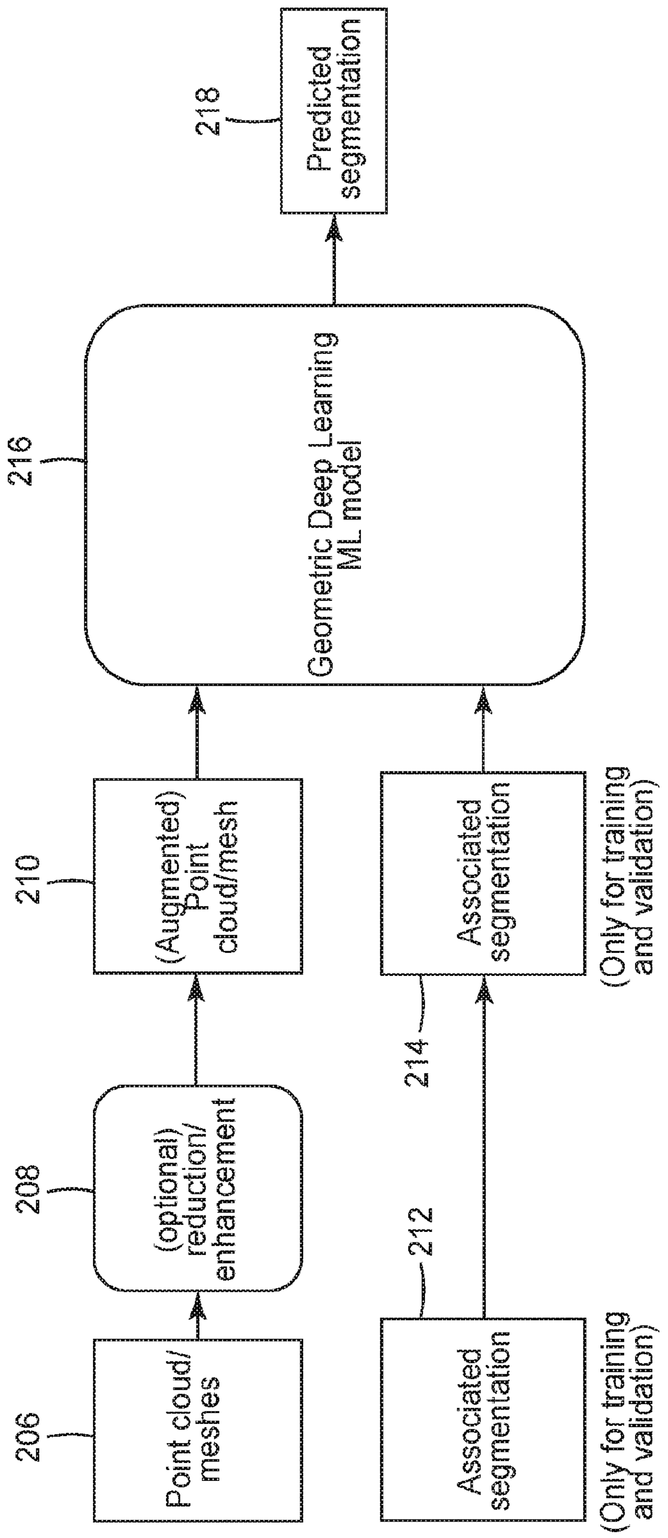
FIG. 28 is a training pipeline for segmentation.
Figure 29:
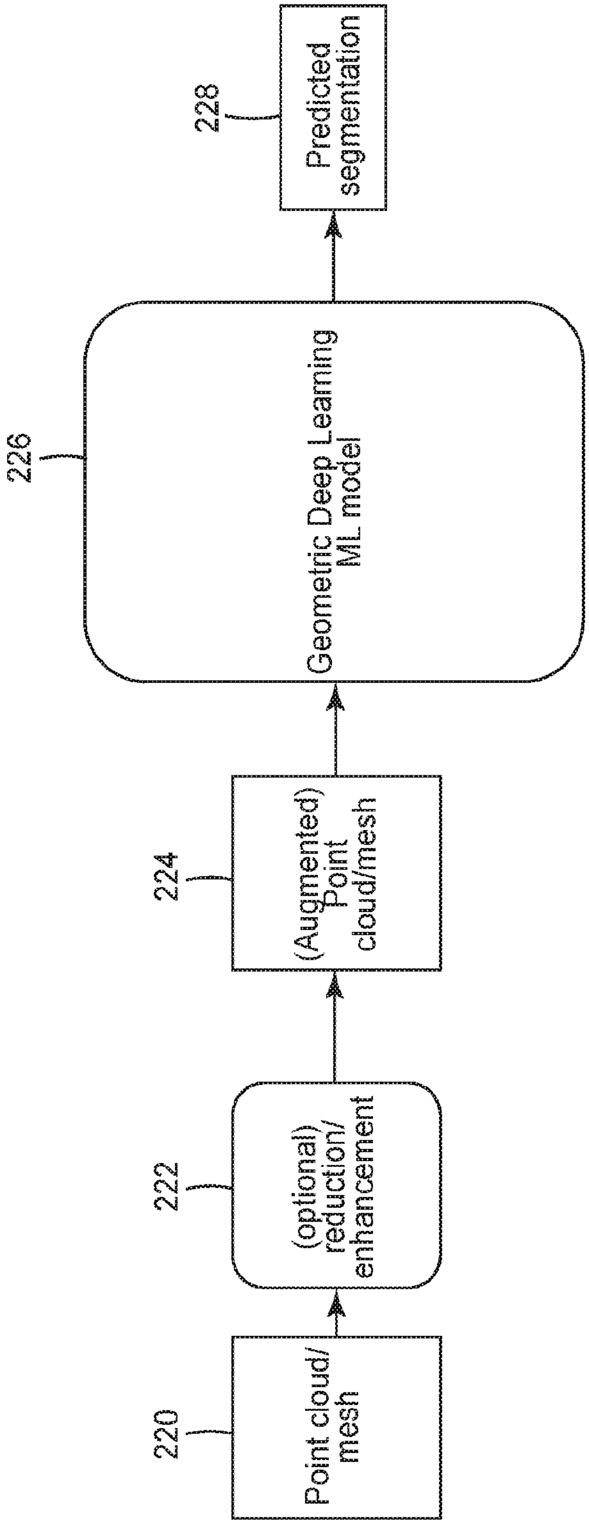
FIG. 29 is a testing pipeline for segmentation.

FIGS. 28 and 29 illustrate the workflow of the method.

The flow chart in FIG. 28 provides the following method for a training pipeline, as further described herein.

1. Point cloud/meshes (206).
    a. For training and validation only, associated segmentation (212).
2. (Optional) reduction/enhancement (208).
3. (Augmented) point cloud/mesh (210).
    a. For training and validation only, associated segmentation (214).
4. GDL machine learning model (216).
5. Predicted segmentation (218).

The flow chart in FIG. 29 provides the following method for a testing pipeline, as further described herein.

1. Point cloud/mesh (220).
2. (Optional) reduction/enhancement (222).
3. (Augmented) point cloud/mesh (224).
4. GDL machine learning model (226).
5. Predicted segmentation (228).

During training, both a point cloud and the associated segmentation is passed in whereas during testing, only the point cloud is passed in.

Stages in the Workflow:

1. Preprocessing:
   a. (Optional) Point Cloud Reduction/Enhancement: The methods can use point cloud reduction techniques such as random down sampling, coverage aware sampling or other mesh simplification techniques (if meshes are available), to reduce the size of the point cloud down to facilitate faster inference. The methods can also use mesh interpolation techniques to enhance the size of the point cloud to achieve higher granularity.
   b. (Optional) Segmentation Reduction/Enhancement: If the point cloud is decimated, then the segmentation of the resulting point cloud is decimated accordingly by dropping out the decimated points. If the point cloud is augmented, then the segmentation labels for the newly created points are determined using nearest neighbor queries to the points in the original point cloud.
2. Model Inference:

The (augmented) point cloud is passed through the machine learning model and the associated approximate coordinate system is obtained. The steps related to the use of the machine learning model are provided below.

a. Training of the model: Model is embodied as a collection of tensors (referred to as model weights), meaningful values for these model weights are learned through the training process. These weights are initialized completely at random.

The training process uses training data, which is a set of pairs of data points and the associated coordinate systems. This data is assumed to be available before the creation of the model.

The methods pass batches randomly selected from the training data set into the model and compute the loss function. This loss function measures the dissimilarity between the ground truth coordinate systems and the predicted coordinate systems.

The methods infer the gradients from the computed loss function and update the weights of the model. This process is repeated either for a predefined number of iterations or till a certain objective criterion is met.

b. Validation of the model: Alongside training, it is typical for models to be constantly validated to monitor potential problems with training, such as overfitting.

The methods can use a validation set available at the beginning of training. This data set is similar to the training data set, in that it is a set of paired data points and associated coordinate systems.

After a set number of training iterations, the methods pass the validation set to the model and compute the loss function value. This value serves as a measure of how well the model generalizes on unseen data. The validation loss values can be used as a criterion for stopping the training process.

c. Testing of the model: The testing of the model typically happens on unseen data points, those that do not have an associated annotated segmentation.

III. Regression

These embodiments include, for example, the following.

Case complexity: Use a regression module to classify the complexity level of a treatment for a case given a scanned arch.

Case characteristics: Use a regression model to classify scanned arch meshes based on case characteristics such as bite relationship (Class 1, 2, or 3), bite (overbite/deep bite), midline shift, etc. Use a regression model to classify scanned arch meshes based on existing labels of case characteristics, such as bite relationship (class 1, 2, or 3), bite (overbite, overjet, anterior/posterior crossbite), midline offset, anterior leveling, spaces/crowding, arch form, and protocols applied (extrusion, expansion, distalization).

Predict treatment duration: Use a regression module to classify the complexity level of a treatment for a case given a scanned arch, which is later used to predict the amount of care and treatment time needed.

A. Coordinate System

This embodiment includes a machine learning method to determine the relative pose or coordinate system for a 3D object with respect to a global frame of reference. Such a method has impact on problems such as orthodontic treatment planning, etc.

The problem of determining pose of a 3D object is usually resolved using computational geometry approaches. 3D pose estimation from 2D images, especially of humans and human faces, is a well-studied problem. However, there are scenarios where the relative pose of a 3D object given a frame of reference is important, and information about the shape of the object in 3D is available. Traditionally, explicit description of shape features and matching to a template or registering to a template are used to determine the pose. For example, the Iterative Closest Point (IC) algorithm can be used to register an observed target 3D shape to a canonical template. Then the inferred transformation matrix can be used to transform the pose of the reference template to the target shape.

Deep learning methods directly applied on 3D shape representations have been used to solve two problems: 1) Object classification; and 2) Semantic segmentation or vertex/element-wise classification. Using similar techniques to predict the pose or coordinate system is possible. The requirement is that the model predicts a set of real numbers or a transformation matrix that represents the pose—position and orientation of the 3D object with respect to the global frame of reference. This can be represented by seven output parameters—3 for translation and 4 for the quaternion representation of the rotation. This provides fewer than the 12 parameters that would be required to represent the full transformation matrix. However, this representation is not limited and other representations such as axis angle or Euler angles can also be used.

Figure 30:
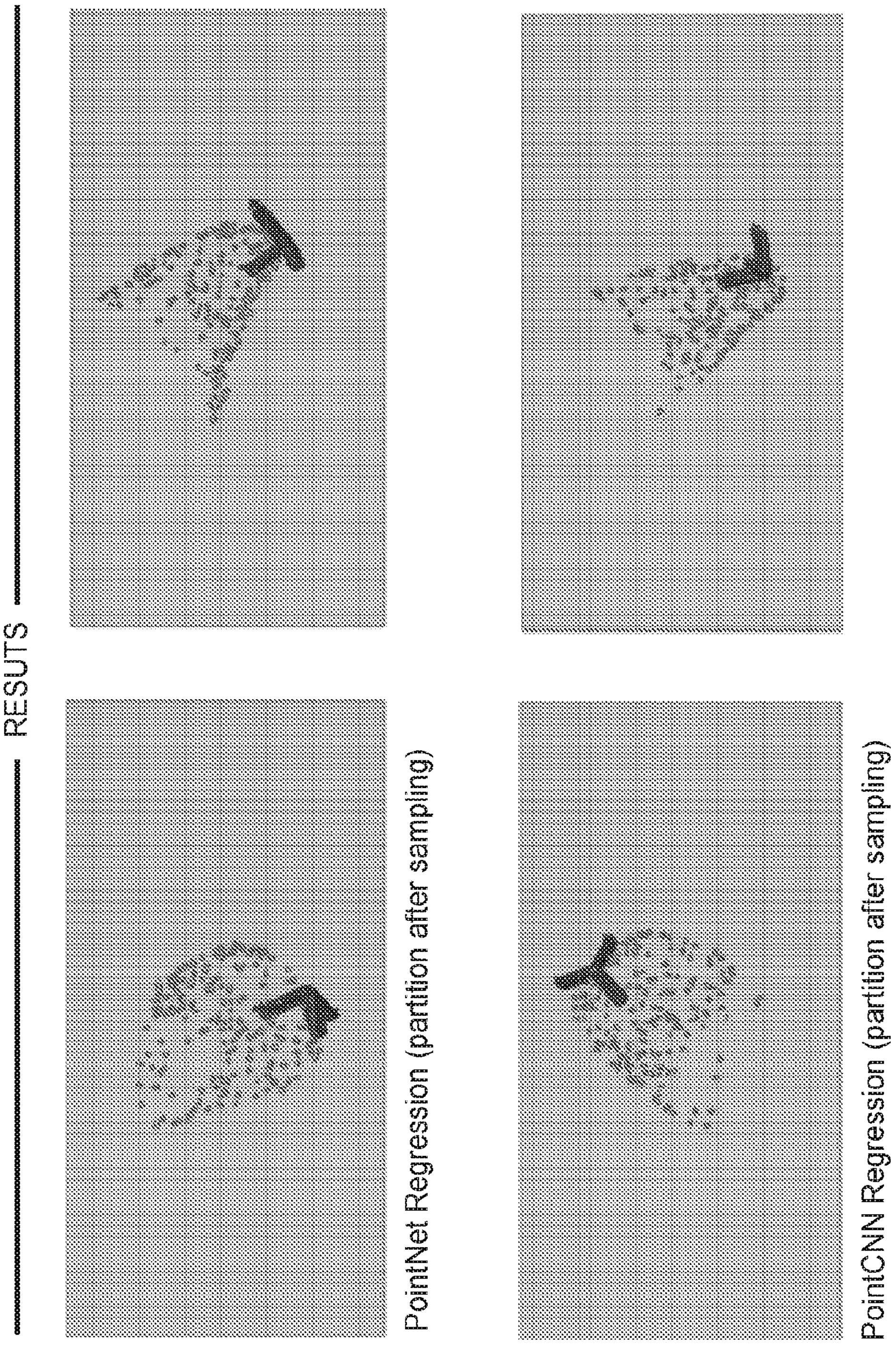
FIG. 30 shows tooth coordinate system prediction.

Method: Given a large number of training data of mesh geometry (e.g., mesh representations of teeth) and corresponding output transformation parameters as labels, a mesh based or point based deep learning model can be trained, for example using PointNet, PointCNN, etc. Additionally, during training data augmentation can be performed on the input mesh such as under-sampling, rotating, and permuting the points. This can help generate thousands of augmented input data from a single source greatly increasing the chance that the algorithm delivers higher performance. FIG. 30 shows tooth coordinate system prediction.

The following are exemplary embodiments for coordinate system prediction: Method of receiving 3D point cloud or mesh data, using a machine learning algorithm to predict relative pose and position given a global frame of reference; and method of receiving 3D point cloud or mesh data, using a registration algorithm to align point cloud to a known set of one or more templates and then using the results to determine relative pose and position with respect to a global frame of reference.

These embodiments can be used, for example, where the 3D point cloud represents teeth and where the registration algorithm can be ICP, ICP with point to plane distance metric, etc.

B. Coordinate System Using Inferences

These methods use GDL to infer the orientation/coordinate system of an object using only a point cloud obtained from its surface using different scanning hardware.

In these methods, a machine learning approach is used to infer a map between the point cloud and an associated coordinate system. An example of such an algorithm can use a modification of PointNet. The methods train the model using a dataset of point clouds acquired using intra-oral scans (referred to as data points), embodied as collections of (x,y,z) coordinates of each point in the point cloud and the associated coordinate systems, embodied in a six-dimensional representation. The model functions as a regression map between the point cloud domain and the coordinate system domain, in that, given a point cloud, the model infers the associated coordinate system.

This map can later be used in other geometric operations. For instance, in the case of digital orthodontics, this model can be used to standardize the incoming point cloud in a coordinate system that is conducive for processing without the need for having a human in the loop. This effectively and significantly reduces the processing time for each case and also reduces the need to train human workers to perform this task.

Figure 31:
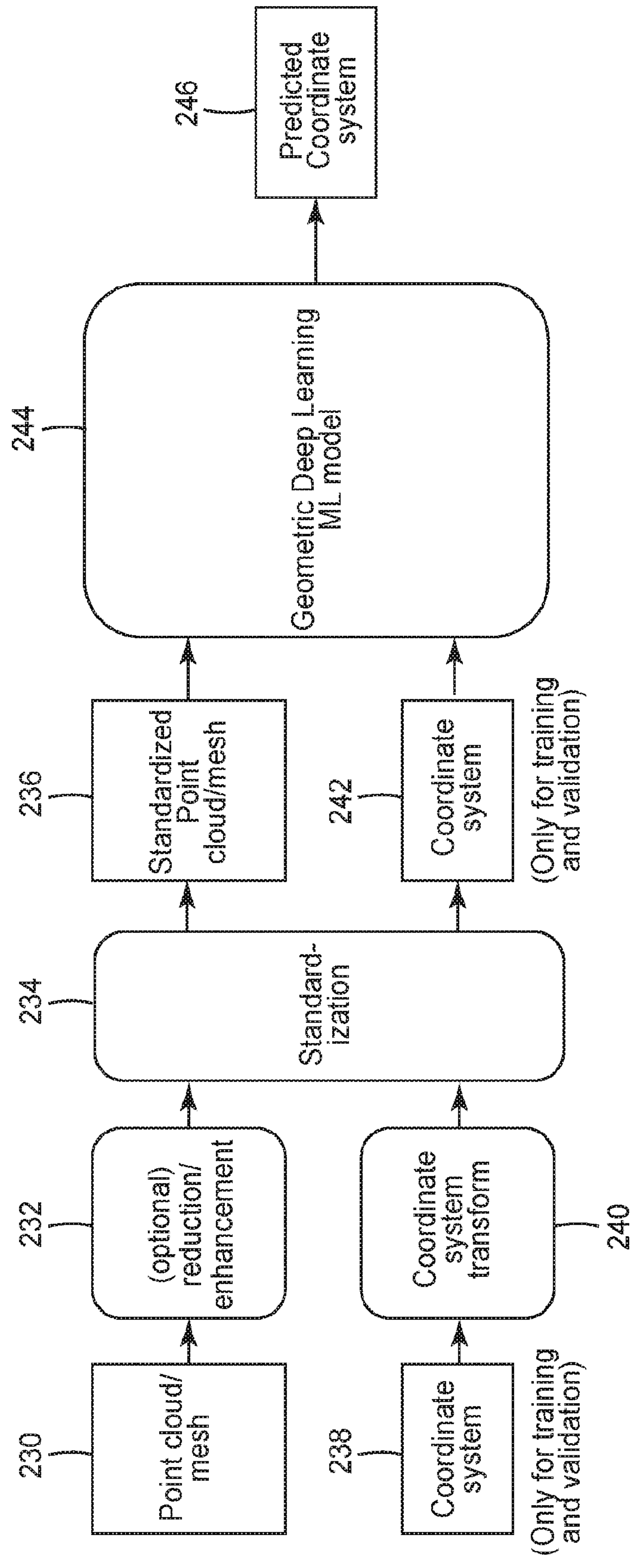
FIG. 31 is a training pipeline for predicting coordinate systems.
Figure 32:
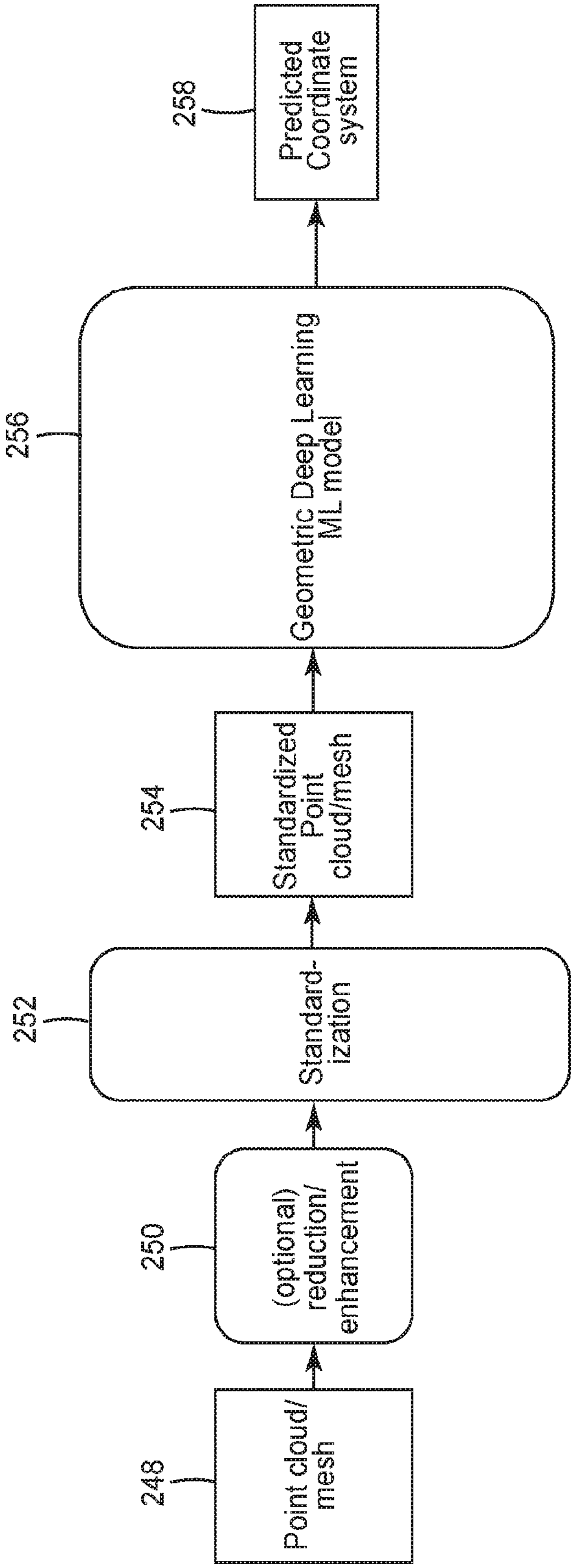
FIG. 32 is a testing pipeline for predicting coordinate systems.

FIGS. 31 and 32 illustrate the high-level workflow of the method.

The flow chart of FIG. 31 provides a method for a training pipeline, as further described herein.

1. Point cloud/mesh (230).
   a. For training and validation only, coordinate system (238).
   b. Coordinate system transform (240).
2. (Optional) reduction/enhancement (232).
3. Standardization (234).
4. Standardized point cloud/mesh (236).
   a. For training and validation only, coordinate system (242).
5. GDL machine learning model (244).
6. Predicted coordinate system (246).

The flow chart of FIG. 32 provides a method for a testing pipeline, as further described herein.

1. Point/cloud mesh (248).
2. (Optional) reduction/enhancement (250).
3. Standardization (252).
4. Standardized point cloud/mesh (254).
5. GDL machine learning model (256).
6. Predicted coordinate system (258).

Method workflow: Input point clouds are obtained from segmenting teeth from a scanned arch. This point cloud is originally in a "global coordinate system." The following are stages in the workflow:

1. Preprocessing:
   a. (Optional) Point Cloud Reduction/Enhancement: The methods can use point cloud reduction techniques such as random down sampling, coverage aware sampling, or other mesh simplification techniques (if meshes are available), to reduce the size of the point cloud to facilitate faster inference. The methods can also use mesh interpolation techniques to enhance the size of the point cloud to achieve higher granularity.

b. Point Cloud Standardization: The methods use whitening process to bring the mean of the point cloud to the origin and align the major axes of the point cloud to the X, Y, Z axes. This method is based off Principal Component Analysis (PCA). This method subtracts out the mesh mean from every point in the point cloud and rotates the point cloud using the inverse of the orthogonal matrix consisting of the eigenvectors of the auto correlation matrix of the point cloud, extracted using PCA. While standardizing the point cloud, the method also changes the associated coordinate system to reflect this affine transformation.
   c. Coordinate system determination: The coordinate system is encoded in a six-dimensional vector. The first three, referred to as the translational component, encode the position of the origin of the local coordinate system in the global coordinate system. The last three, referred to as the rotational component, encode the orientation of the coordinate axes. This conversion uses the Cayley Transform. The original orientation may be encoded as an Orthogonal matrix or as a set of Euler angles and this method takes them to the corresponding Cayley Angles.

2. Model Inference:

The standardized point cloud is passed through the machine learning model and the associated approximate coordinate system is obtained. The steps related to the use of the machine learning model are provided below.

a. Training of the model: Model is embodied as a collection of tensors (referred to as model weights). Meaningful values for these model weights are learned through the training process. These weights are initialized completely at random.

The training process uses training data, which is a set of pairs of data points and the associated coordinate systems. This data is assumed to be available before the creation of the model.

The methods pass batches randomly selected from the training data set into the model and compute the loss function. This loss function measures the dissimilarity between the ground truth coordinate systems and the predicted coordinate systems.

The methods infer the gradients from the computed loss function and update the weights of the model. This process is repeated either for a predefined number of iterations or until a certain objective criterion is met.

b. Validation of the model: Alongside training, it is typical for models to be constantly validated to monitor potential problems with training, such as overfitting.

The methods assume that there is a validation set available at the beginning of training. This data set is similar to the training data set, in that it is a set of paired data points and associated coordinate systems.

After a set number of training iterations, the methods pass the validation set to the model and compute the loss function value. This value serves as a measure of how well the model generalizes on unseen data. The validation loss values can be used as a criterion for stopping the training process.

c. Testing of the model: The testing of the model typically happens on unseen data points, those that do not have an associated ground truth coordinate system. This is done in deployment.

3. (Optional) Post processing: The estimated coordinate systems in embodied in a six-dimensional vector and can then be converted into any desired format, for example Euler angles. The methods can also convert the input mesh using this estimated coordinate system into its local coordinates, and these can then be used for other operations in the pipeline.

Below is the description of our experimental setup for this task, and the results for some of the teeth.

Experimental Setup:

A set of 65 cases (possibly partially complete) were divided into a training and a validation set using a 4:1 split. Each case was a collection of a point cloud and its associated human annotated coordinate system. The point clouds corresponding to these cases had variable input point densities and were non-homogenous in their sizes as well. Only the (x,y,z) coordinates of the points as their feature vectors were used.

Figure 33:
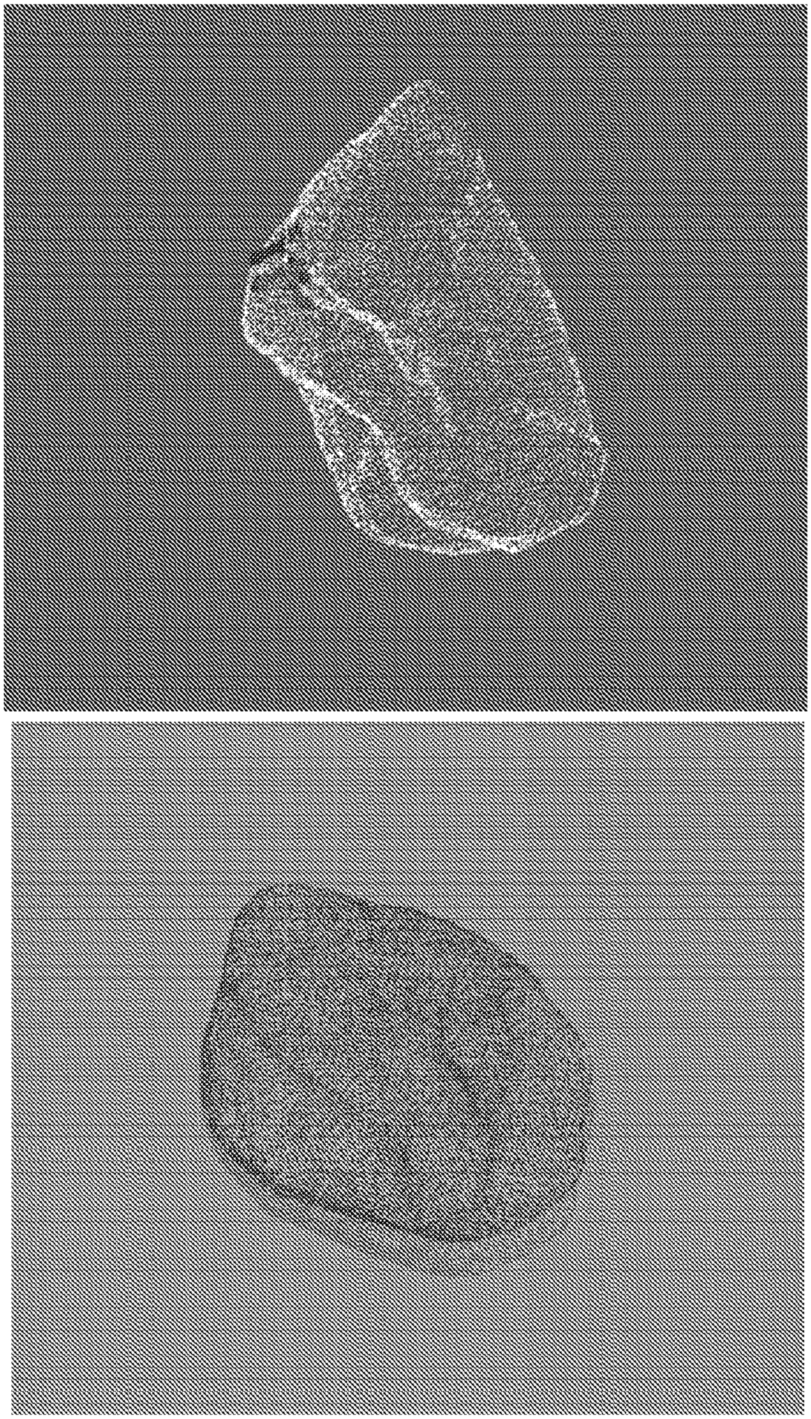
FIG. 33 shows predictions on second molar upper right arch (UNS=1).

Results:

FIG. 33 shows some of the results on the validation set for the performance of our model and illustrates predictions on second molar upper right arch (UNS=1). There are two illustrations for each case. The first one (top illustration) corresponds to a coordinate system overlay on top of the mesh. The second one (bottom illustration) corresponds to the difference in the transformed point clouds using the coordinate system prediction. Red color (or a first shading) is used to denote the prediction of our machine model, and blue color (or a second shading different from the first shading) is used to denote the ground truth annotation corresponding to the validation point.

IV. Automatic Encoders and Clustering—Grouping Providers and Preferences

These embodiments include, for example, the following.

Grouping doctors and preferences: Using an unsupervised approach such as clustering, providers (e.g., doctors, technicians, or others) are grouped based on their treatment preferences. Treatment preferences could be indicated in a treatment prescription form, or they could be based upon characteristics in treatment plans such as setup characteristics (e.g., amount of bite correction or midline correction in planned final setups), staging characteristics (e.g., treatment duration, tooth movement protocols, or overcorrection strategies), or outcomes (e.g., number of revisions/refinements).

Using a supervised approach and provider identifications in existing data, a recommendations system is trained for each provider based on their past preferences.

Using a supervised approach, long paragraphs of provider's (e.g., doctor's) notes are translated or converted into the correct order of procedures that setup technicians follow during treatment design.

Figure 34:
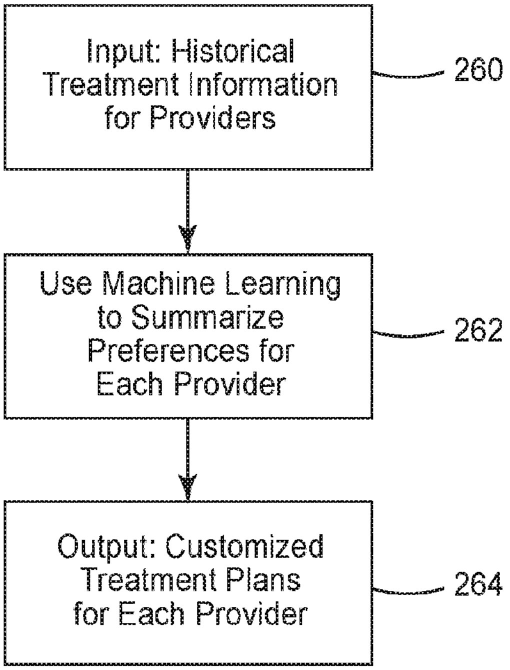
FIG. 34 is a process for using machine learning to group providers and preferences.

The flow chart in FIG. 34 provides a method for provider preferences.

1. Input: Historical treatment information for providers, for example treatment prescription forms for each provider (260).
2. Use machine learning to summarize preferences for each provider, for example using any of the machine learning techniques described herein (262).
3. Output: Customized treatment plans for each provider based upon the provider's preferences and past treatments (264).

After provider preferences have been summarized by machine learning, the treatment planning algorithm considers those preferences and generates customized future treatment plans according to each provider's (e.g., doctor's) past treatments. The customization of treatment can reduce the number of revisions of plans between the doctors and technicians. The following Table provide an exemplary data structure for storing these provider preferences and customized treatment plans. The customized treatment plans can be stored in other ways and templates.

TABLE

| Provider | Preferences | Customized Treatment Plans |
|---|---|---|
| Provider 1 | Preference 1a | Treatment Plan 1a |
| | Preference 1b | Treatment Plan 1b |
| | . . . | |
| | Preference 1n | Treatment Plan 1n |
| Provider 2 | Preference 2a | Treatment Plan 2a |
| | Preference 2b | Treatment Plan 2b |
| | . . . | |
| | Preference 2n | Treatment Plan 2n |
| . . . | | |
| Provider N | Preference Na | Treatment Plan Na |
| | Preference Nb | Treatment Plan Nb |
| | . . . | |
| | Preference Nn | Treatment Plan Nn |

The methods and processes described herein can be implemented in, for example, software or firmware modules for execution by one or more processors such as processor 20. Information generated by the methods and processes can be displayed on a display device such as display device 16. If user interaction is required or desired for the methods and processes, such interaction can be provided via an input device such as input device 18.

The GDL and machine learning embodiments described herein can be combined in order to use the GDL processing for any combination of the embodiments, such as the following.

The mesh or model cleanup process described in Section I can be performed before or along with the dental restoration prediction process described in Section I to provide a cleaned up mesh or model to the dental restoration prediction process.

The mesh or model cleanup process described in Section I, along with segmentation process described in Section II and the coordinate system process described in Section III, can be performed before or along with the dental restoration prediction process described in Section I to provide a cleaned up mesh or model with segmentation and a coordinate system to the dental restoration prediction process.

The mesh or model cleanup process described in Section I can be performed before or along with the dental restoration validation process described in Section I to provide a cleaned up mesh or model to the dental restoration validation process.

The mesh or model cleanup process described in Section I, along with segmentation process described in Section II and the coordinate system process described in Section III, can be performed before or along with the dental restoration validation process described in Section I to provide a cleaned up mesh or model with segmentation and a coordinate system to the dental restoration validation process.

The dental restoration prediction process described in Section I can be performed with the dental restoration validation process described in Section I, one before the other or at least partially simultaneously.

The mesh or model cleanup process described in Section I can be performed before or along with the dental restoration prediction process described in Section I is performed with the dental restoration validation process described in Section I to provide a cleaned up mesh or model to the dental restoration prediction and validation processes.

The mesh or model cleanup process described in Section I can be performed, along with the segmentation process described in Section II and the coordinate system process described in Section III, before or along with the dental restoration prediction process described in Section I is performed with the dental restoration validation process described in Section I to provide a cleaned up mesh or model, segmented and with a coordinate system, to the dental restoration prediction and validation processes.

The mesh or model cleanup process described in Section I can be performed before or along with the segmentation process described in Section II to provide a cleaned up mesh or model to the segmentation process.

The mesh or model cleanup process described in Section I can be performed before or along with the coordinate system process described in Section III to provide a cleaned up mesh or model to the coordinate system process.

The segmentation process described in Section II can be performed with the coordinate system process described in Section III, one before the other or at least partially simultaneously, to provide a mesh or model both segmented and with a coordinate system.

The mesh or model cleanup process described in Section I can be performed before or along with the segmentation process described in Section II is performed with the coordinate system process described in Section III to provide a cleaned up mesh or model to the segmentation process and the coordinate system process.

The mesh or model cleanup process described in Section I, the dental restoration prediction and validation processes described in Section I, the segmentation process described in Section II, and the coordinate system process described in Section III can be selectively used with the grouping providers process described in Section IV when generating the customized treatment plans.

The invention claimed is:

1. A computer-implemented method of digital 3D model modification, comprising steps of:
- receiving a digital 3D representation of one or more intra-oral structures, wherein the digital 3D representation includes at least one of a point cloud or 3D mesh;
- applying a first trained machine learning model on the digital 3D representation, wherein the first trained machine learning model is configured to receive as input the digital 3D representation of one or more intra-oral structures in the form of a point cloud or 3D mesh, and to generate a segmentation by operating directly on the digital 3D representation using a neural network architecture that applies convolution, pooling, and unpooling layers directly to 3D mesh edges or one or more points in the point cloud, such that the processing is invariant to rotation, scale, and translation of the 3D digital representation and wherein the trained machine learning model is trained using the steps comprising:
  - accessing a partially trained machine learning model;
  - receiving an associated ground truth segmentation;
  - using the partially trained machine learning model, generating a predicted segmentation, wherein the partially trained machine learning model is configured such that the generating is invariant to one or more rotation, scaling, or translation changes to the digital 3D representation;
  - computing a loss value that quantifies a dissimilarity between the associated ground truth segmentation and the predicted segmentation; and
  - modifying one or more aspects of the partially trained machine learning model to generate the first trained machine learning model; and
- outputting via the first trained machine learning model one or more labels for one or more aspects of the 3D representation.

2. The computer-implemented method of claim 1, wherein the first machine learning model is a neural network.

3. The computer-implemented method of claim 2, wherein the one or more aspects of the neural network are weights and modifying the one or more aspects comprises modifying the one or more weights based, at least in part, on the loss value.

4. The computer-implemented method of claim 1, wherein the predicted segmentation comprises at least one tooth pertaining to a patient's dental anatomy.

5. The computer-implemented method of claim 1, further comprising:
- training a second machine learning model for the validation of at least one of a dental appliance or an orthodontic appliance.

6. The computer-implemented method of claim 1, further comprising
- training a second machine learning model for modifying one or more aspects of the digital 3D representation.

7. The computer-implemented method of claim 1, further comprising:
- training a second machine learning model for predicting one or more local coordinates axes for at least one tooth in the digital 3D representation, wherein at least one of the X, Y, or Z axes of the local coordinate axes are predicted.

8. The computer-implemented method of claim 1, further comprising training a second machine learning model for predicting one or more tooth shapes resulting from of one or more dental restoration procedures.

9. The computer-implemented method of claim 1, wherein at least one weight of the first machine learning model is trained, at least in part, by transfer learning.

10. The computer-implemented method of claim 1, wherein the first trained machine learning model is configured to infer at least one feature using a combination of a plurality of non-linear functions of higher dimensional latent or hidden features.

11. The computer-implemented method of claim 1, wherein a second machine learning model is initially generated based on at least one weight of the first machine learning model.

12. The computer-implemented method of claim 1, wherein the first trained machine learning model comprises a regression neural network configured to receive as input the digital 3D representation in the form of a point cloud or 3D mesh and to predict at least one continuous-valued geometric property of the 3D representation, including but not limited to a coordinate system, pose, or adjustment parameter, based on the input.

13. A computer system comprising:
- a non-transitory computer-readable memory; and
- one or more computer processors in communication with the memory, wherein the one or more processors are configured to:
  - receive a digital 3D representation of one or more intra-oral structures, wherein the digital 3D representation includes at least one of a point cloud or 3D mesh;
  - apply a first trained machine learning model on the digital 3D representation, wherein the first trained machine learning model is configured to receive as input the digital 3D representation of one or more intra-oral structures in the form of a point cloud or 3D mesh, and to generate a segmentation by operating directly on the digital 3D representation using a neural network architecture that applies convolution, pooling, and unpooling layers directly to 3D mesh edges or one or more points in the point cloud, such that the processing is invariant to rotation, scale, and translation of the 3D digital representation and wherein the first trained machine learning model is trained using the steps comprising:

accessing a partially trained machine learning model;

receiving an associated ground truth segmentation;

using the partially trained machine learning model, generating a predicted segmentation;

computing a loss value that quantifies a dissimilarity between the associated ground truth segmentation and the predicted segmentation; and modifying one or more aspects of the partially trained machine learning model to generate the first trained machine learning model; and output via the first trained machine learning model one or more labels for one or more aspects of the 3D representation, wherein the one or more labels are assigned to vertices or regions of the digital 3D representation.

14. The system of claim 13, wherein the first machine learning model is a neural network.

15. The system of claim 14, wherein the neural network is trained, at least in part, by transfer learning.

16. The system of claim 13, wherein the one or more processors are further configured to train a second machine learning model for the validation of at least one of a dental appliance or an orthodontic appliance.

17. The system of claim 13, wherein the one or more processors are further configured to train a second machine learning model for modifying one or more aspects of the digital 3D representation.

18. The system of claim 13, wherein the one or more processors are further configured to train a second machine learning model for predicting one or more local coordinates axes for at least one tooth in the digital 3D representation, wherein at least one of the X, Y, and Z axes of the local coordinate axes system are predicted.

19. The system of claim 13, wherein the one or more processors are further configured to train a second machine learning model for predicting one or more tooth shapes resulting from of one or more dental restoration procedures.

20. The system of claim 13, wherein the first trained machine learning model comprises a regression neural network configured to receive as input the digital 3D representation in the form of a point cloud or 3D mesh and to predict at least one continuous-valued geometric property of the 3D representation, including but not limited to a coordinate system, pose, or adjustment parameter, based on the input.

* * * * *